Nov. 24, 1959  T. C. MANN  2,913,964
MACHINE TOOL WITH CONTROL MEANS FOR TRAVERSING THE TOOL THEREOF
Original Filed Jan. 8, 1954  12 Sheets-Sheet 1.
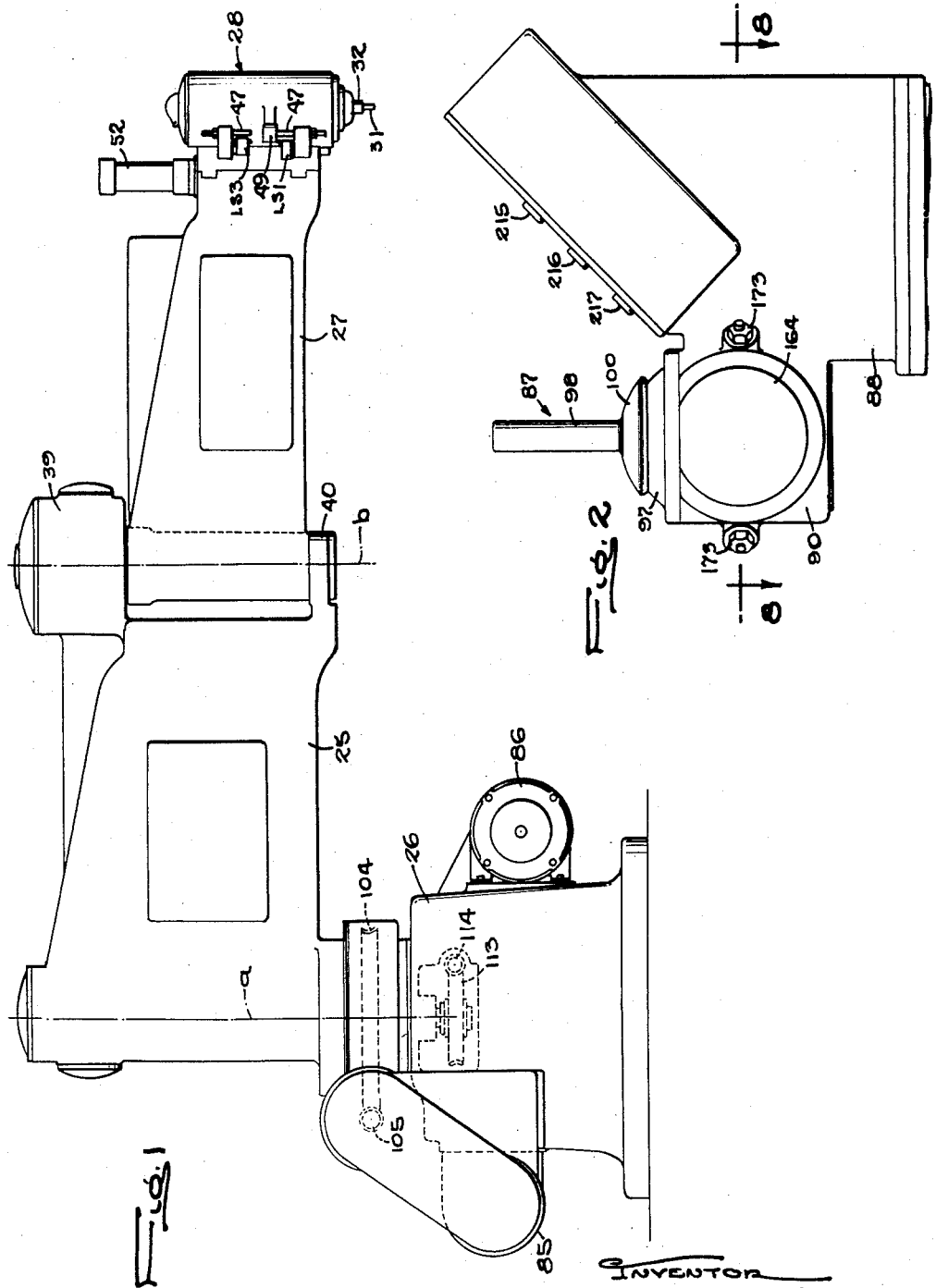
INVENTOR
Theodore C. Mann
By Carlson, Pitney, Husband-Wolfe
ATTORNEY

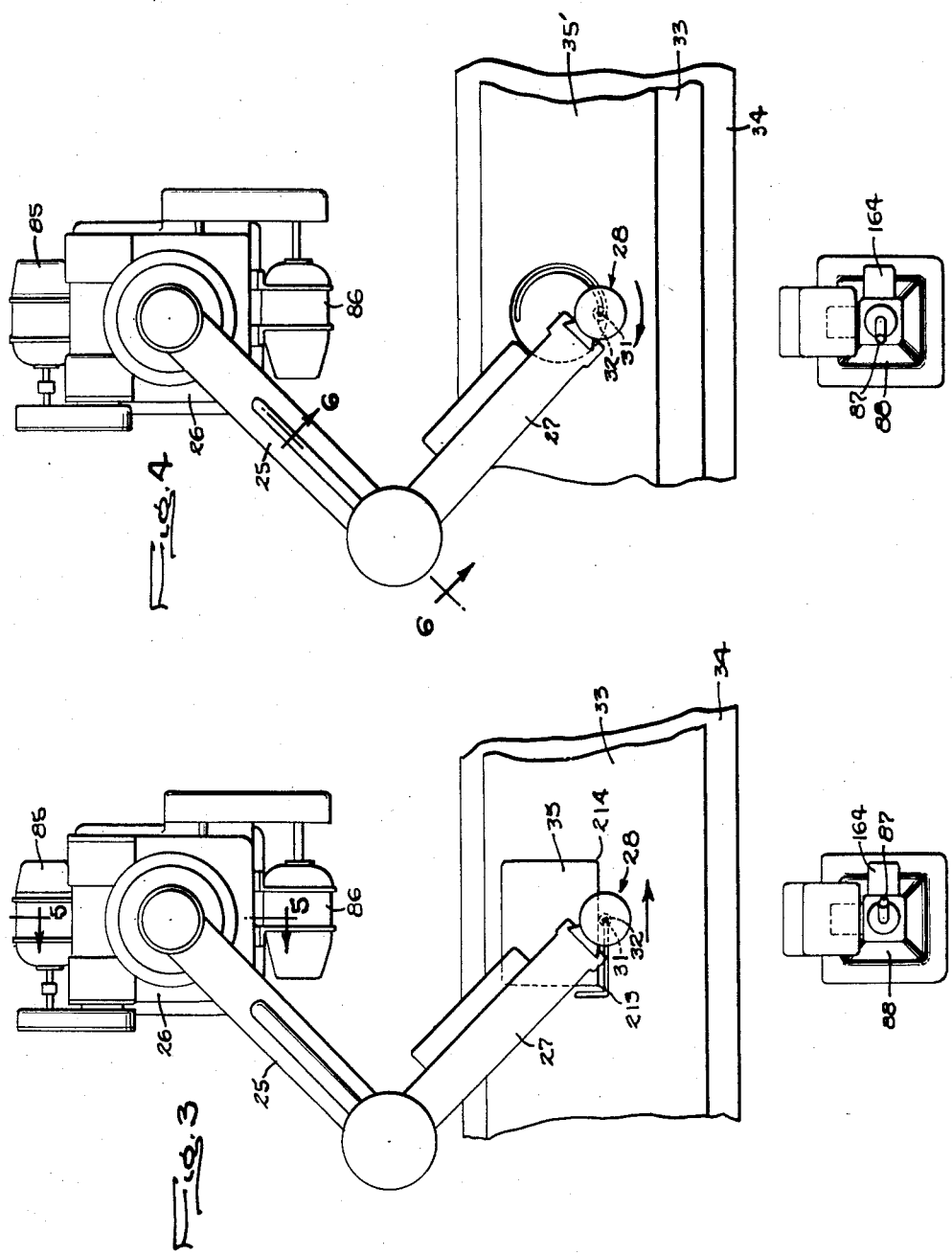

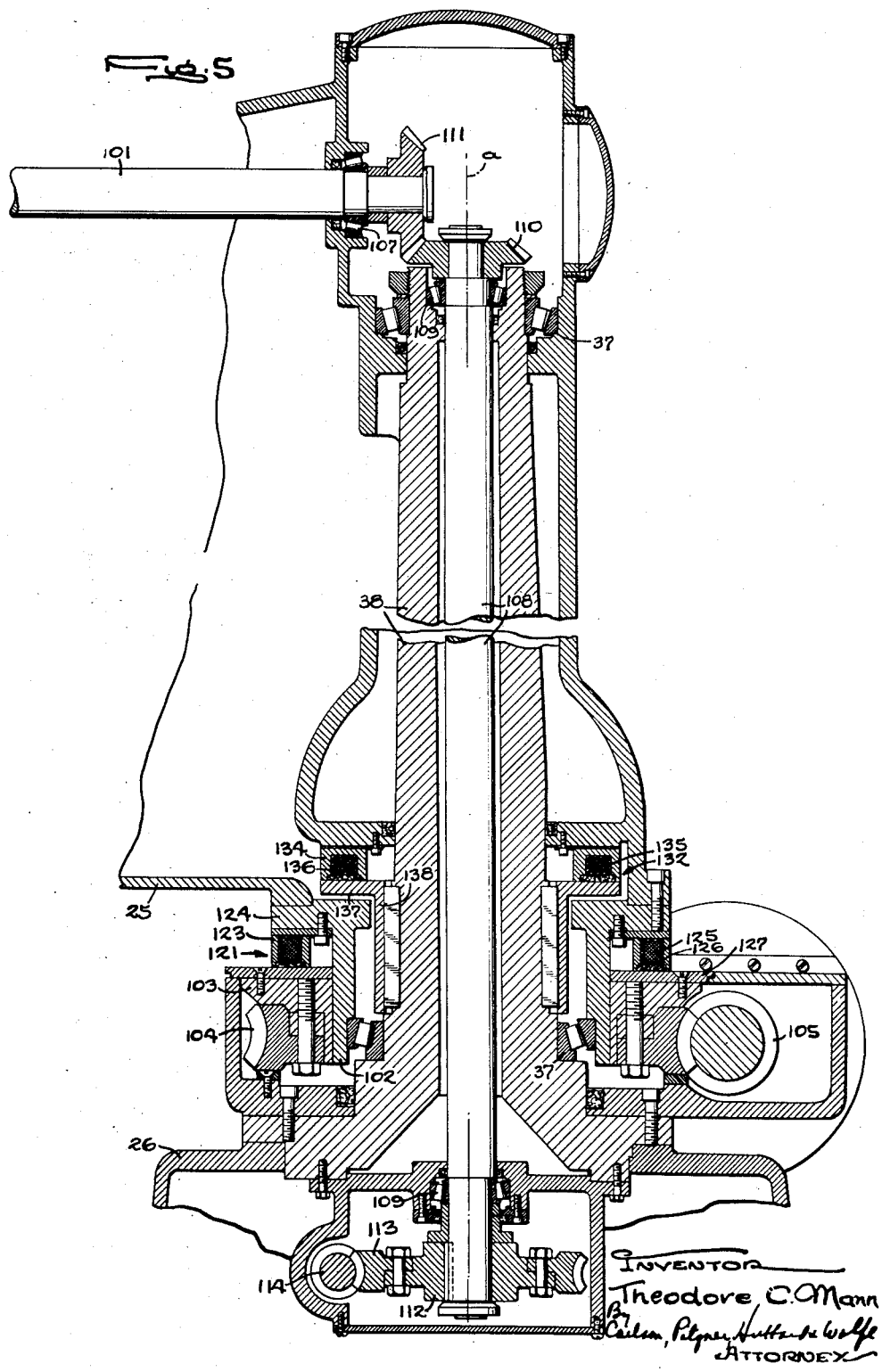

Nov. 24, 1959 T. C. MANN 2,913,964
MACHINE TOOL WITH CONTROL MEANS FOR TRAVERSING THE TOOL THEREOF
Original Filed Jan. 8, 1954 12 Sheets-Sheet 4

INVENTOR
Theodore C. Mann
By Carlson, Pitzner, Hubbard & Wolfe
ATTORNEYS

Nov. 24, 1959 T. C. MANN 2,913,964
MACHINE TOOL WITH CONTROL MEANS FOR TRAVERSING THE TOOL THEREOF
Original Filed Jan. 8, 1954 12 Sheets-Sheet 5

INVENTOR
Theodore C. Mann
By Carlson, Pitzner, Hubbard & Wolfe
ATTORNEY

Nov. 24, 1959 T. C. MANN 2,913,964
MACHINE TOOL WITH CONTROL MEANS FOR TRAVERSING THE TOOL THEREOF
Original Filed Jan. 8, 1954 12 Sheets-Sheet 6
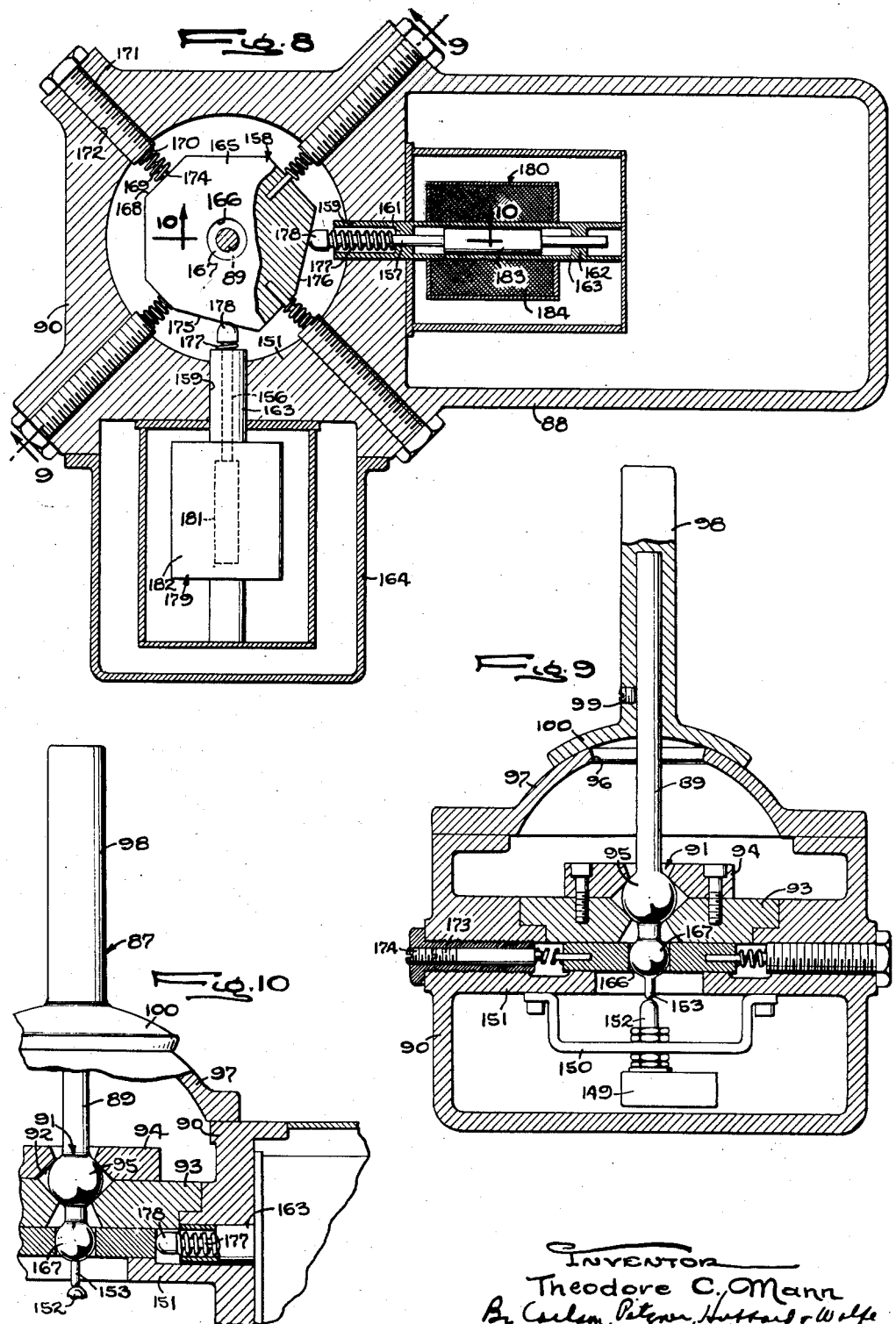

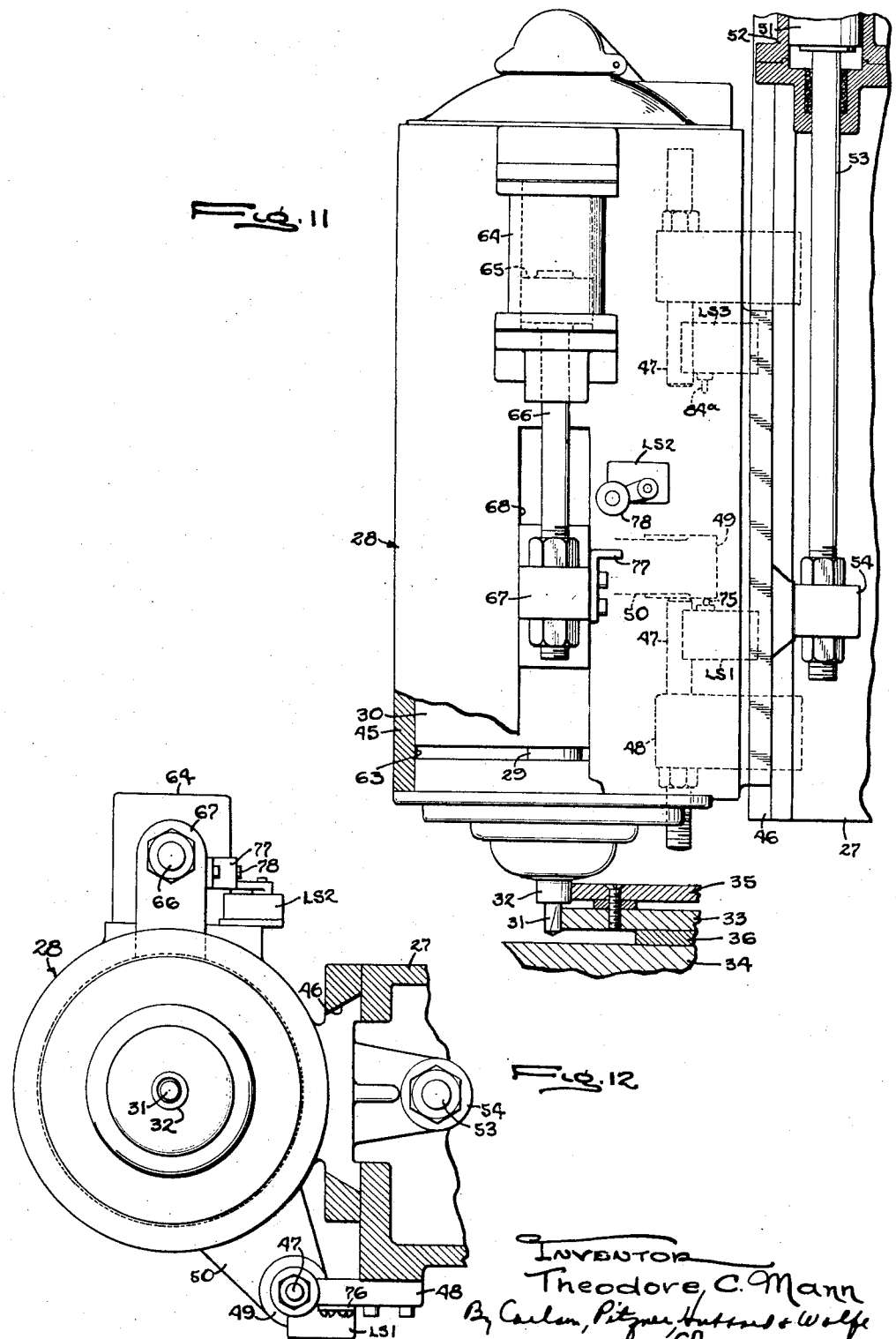

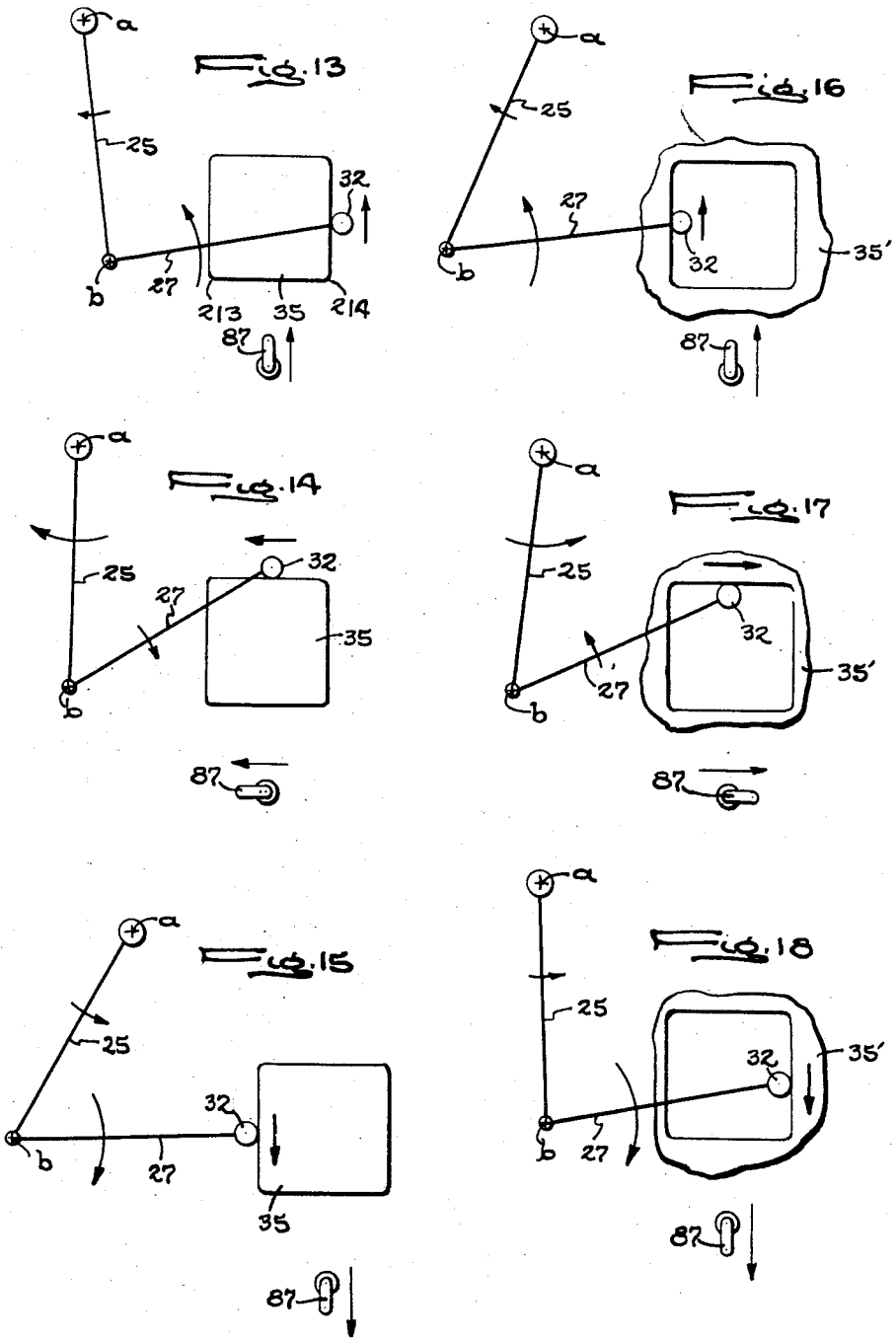

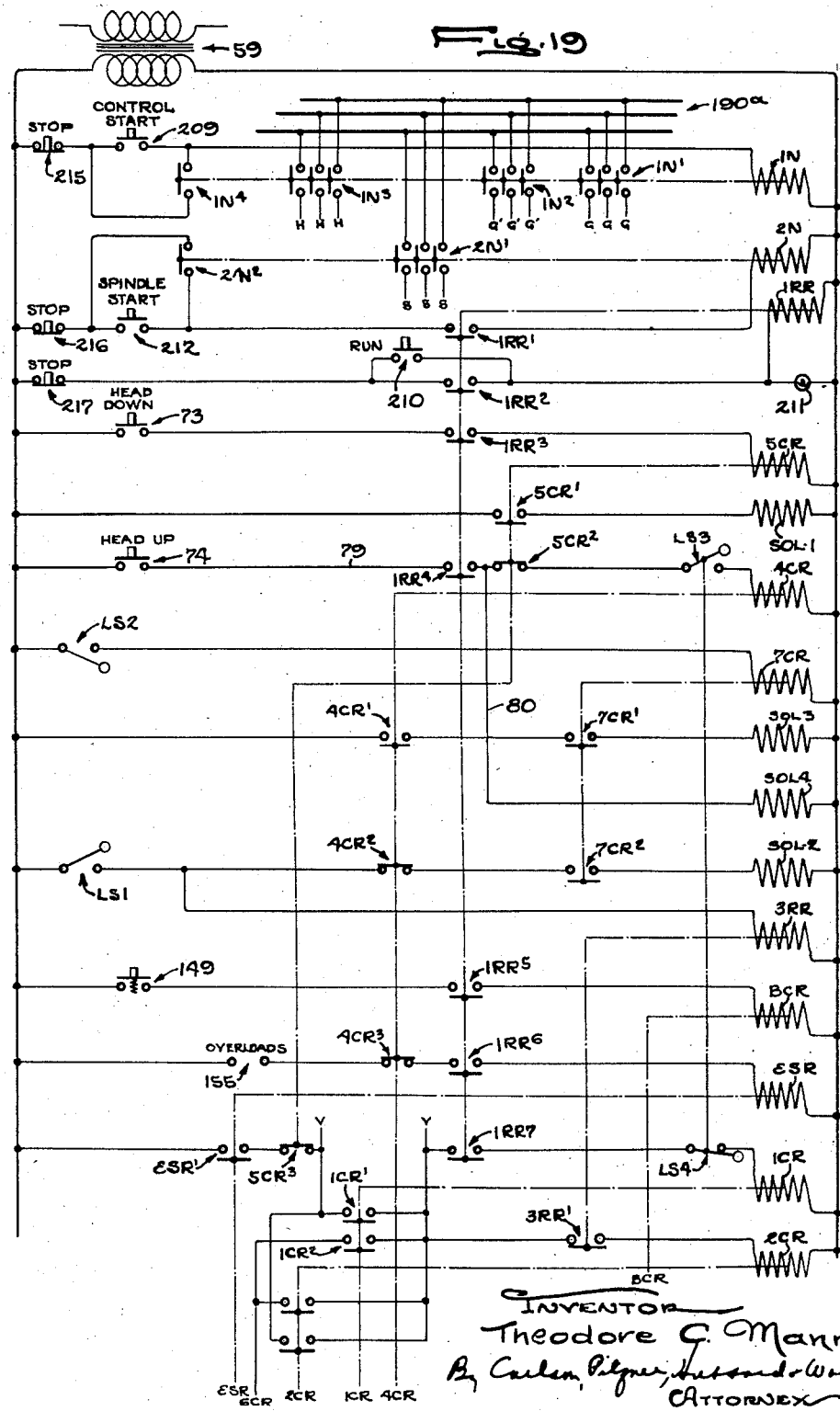

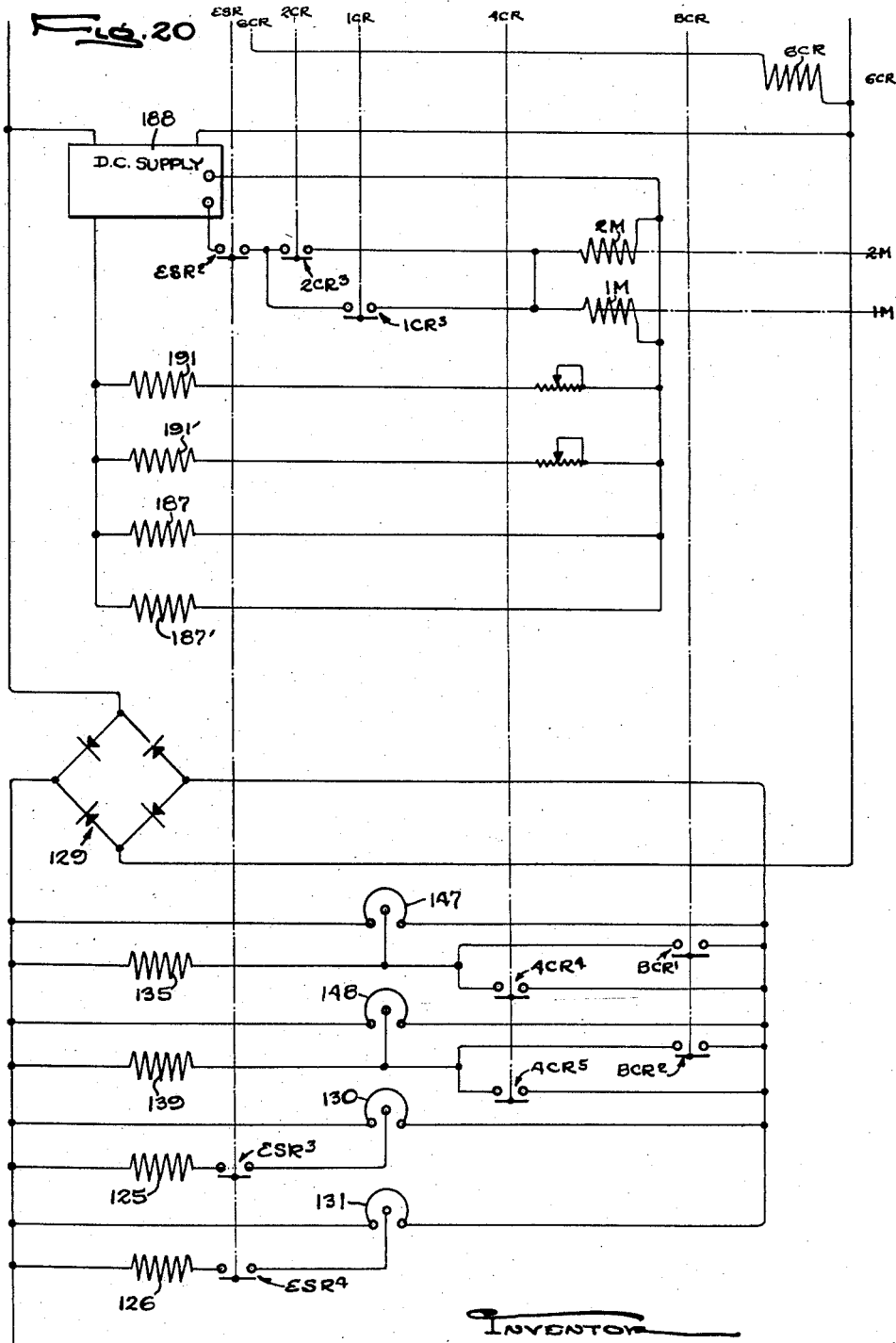

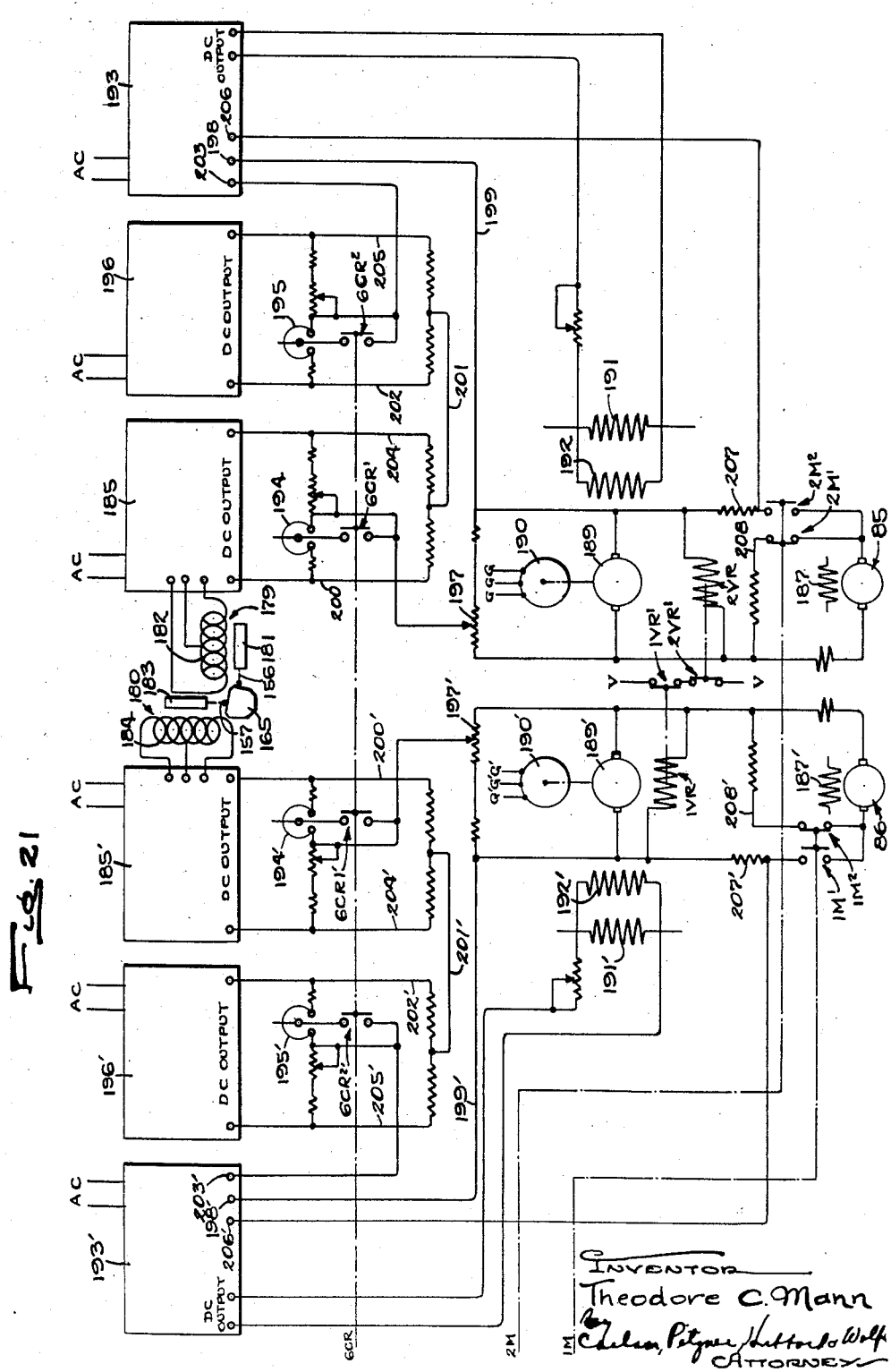

Nov. 24, 1959 T. C. MANN 2,913,964
MACHINE TOOL WITH CONTROL MEANS FOR TRAVERSING THE TOOL THEREOF
Original Filed Jan. 8, 1954 12 Sheets-Sheet 12

INVENTOR
Theodore C. Mann
By Carlson, Pitzner, Hubbard & Wolfe
ATTORNEYS

United States Patent Office 2,913,964
Patented Nov. 24, 1959

2,913,964

MACHINE TOOL WITH CONTROL MEANS FOR TRAVERSING THE TOOL THEREOF

Theodore C. Mann, Beloit, Wis., assignor to Ekstrom-Carlson Co., Rockford, Ill., a corporation of Illinois Continuation of application Serial No. 402,982, January 8, 1954. This application June 19, 1957, Serial No. 666,595

22 Claims. (Cl. 90—13.5)

This invention relates to machine tools, such as milling machines, in which the cutting tool is mounted on one of two movable supports and the supports are separately driven along their respective paths to give the tool, in effect, a compound movement so that it may be traversed around a workpiece. In a machine of this type, a template of the shape to which it is desired to cut the workpiece may be clamped in place on the work and a follower coaxial with the tool is guided around the periphery of the template thus causing the tool to be fed properly. The follower and hence the tool are moved around the template contour by two power actuators which respectively drive the two supports and which, when energized in the proper ratio, produce a resultant force for advancing the follower and the tool in the desired direction.

In its more detailed aspects, the invention has reference to a milling machine of the type normally called a router, that is, one in which an inner arm is pivotally mounted at one end on a base to swing about a predetermined axis and an outer arm is pivotally connected at its inner end to the outer end of the inner arm to swing about a parallel axis. The tool and template follower are mounted on the free end of the outer arm and thus two arms constitute the movable supports and are turned about their respective axes by separate power actuators.

The general object of the invention is to control the energization of the power actuators in a machine tool of the above character by means of a new and improved control system which is responsive to movement of a selector and which is constructed in a novel manner so that power actuators may be energized in widely varying proportions to give the operator of the machine a large selection of directions of the force applied to the tool.

The principal object is to construct the control system to respond in a novel manner to movement of the selector radially from a neutral position in any direction within a predetermined angle and, when the selector is moved in each direction, energize the power actuators differentially and in a ratio different from that resulting when the selector is moved in other directions whereby the actuators are effective to advance the tool in a direction correlated with the direction of selector movement.

A more detailed object is to energize the power actuators through a novel construction and arrangement of two control members which are angularly spaced relative to each other and are moved differentially by the selector in a proportion depending upon the direction of selector movement, the control members energizing respectively the two actuators to a degree according to the distance the members are moved by the selector.

The invention also resides in the novel construction and arrangement of the selector and the control members and in the manner in which the latter are connected to the selector for differential movement.

A further object is to utilize variable speed reversible electric motors as the power actuators and to arrange the selector to vary the direction and magnitude of generators whose output voltage is applied to the motors and thereby controls the energization of the motors.

In another of its aspects, the invention aims to adapt a router of the character described above for actuation by two electric motors which are connected to the arms of the router and are energized by the control members as moved by the selector.

A further object is to provide a novel transmission between each motor and the corresponding arm of the router so that both motors may be mounted stationarily and still transmit the proper torques to the arms in any position of the latter and this without the use of cumbersome flexible connections and the like.

Still another object is to obtain a more accurate control of the movement of the template follower and the tool through the use of brakes which are partially energized and exert a retarding force on the arms.

A more detailed object is to arrange the brakes to be responsive to the control system whereby they are partially energized when the motors are turning the arms but are fully energized to lock the arms in selected positions when the selector is in the neutral position.

Another object is to prevent damage to the machine by connecting the motors to their respective arms through friction couplings which normally transmit the torques to the arms but slip when an excessive load is applied to the tool.

Other objects and advantages of the invention will become apparent from the following detailed description taken in connection with the accompanying drawings, in which—

Figure 1 is a side elevation of a router embodying the novel features of the present invention.

Fig. 2 is a fragmentary side view of the selector and its mounting at a remote control station.

Fig. 3 is a plan view of the router and shows the parts in position for cutting around the outside of a template.

Fig. 4 is a view similar to Fig. 3 but shows the parts in position to cut around the inside of a template.

Fig. 5 is an enlarged fragmentary sectional view taken along the line 5—5 in Fig. 3.

Fig. 8 is an enlarged sectional view taken along the line 8—8 in Fig. 2.

Fig. 9 is a sectional view taken along the line 9—9 in Fig. 8.

Fig. 10 is a fragmentary sectional view taken along the line 10—10 in Fig. 8.

Fig. 11 is an enlarged fragmentary side elevation of the tool head.

Fig. 12 is a bottom view of the head.

Figs. 13, 14 and 15 are schematic views illustrating the manner in which the router arms are moved to advance the tool around the outside of the template.

Figs. 16, 17 and 18 are schematic views showing the manner in which the router arms are moved to advance the tool around the inside of the template.

Fig. 19 is a wiring diagram of a part of the control for the router.

Fig. 20 is a wiring diagram of another part of the control and forms a continuation of Fig. 19 at the bottom thereof.

Fig. 21 is a wiring diagram of a third part of the control circuit showing parts schematically and forms a continuation of Fig. 20 at the right side thereof.

Figure 7:
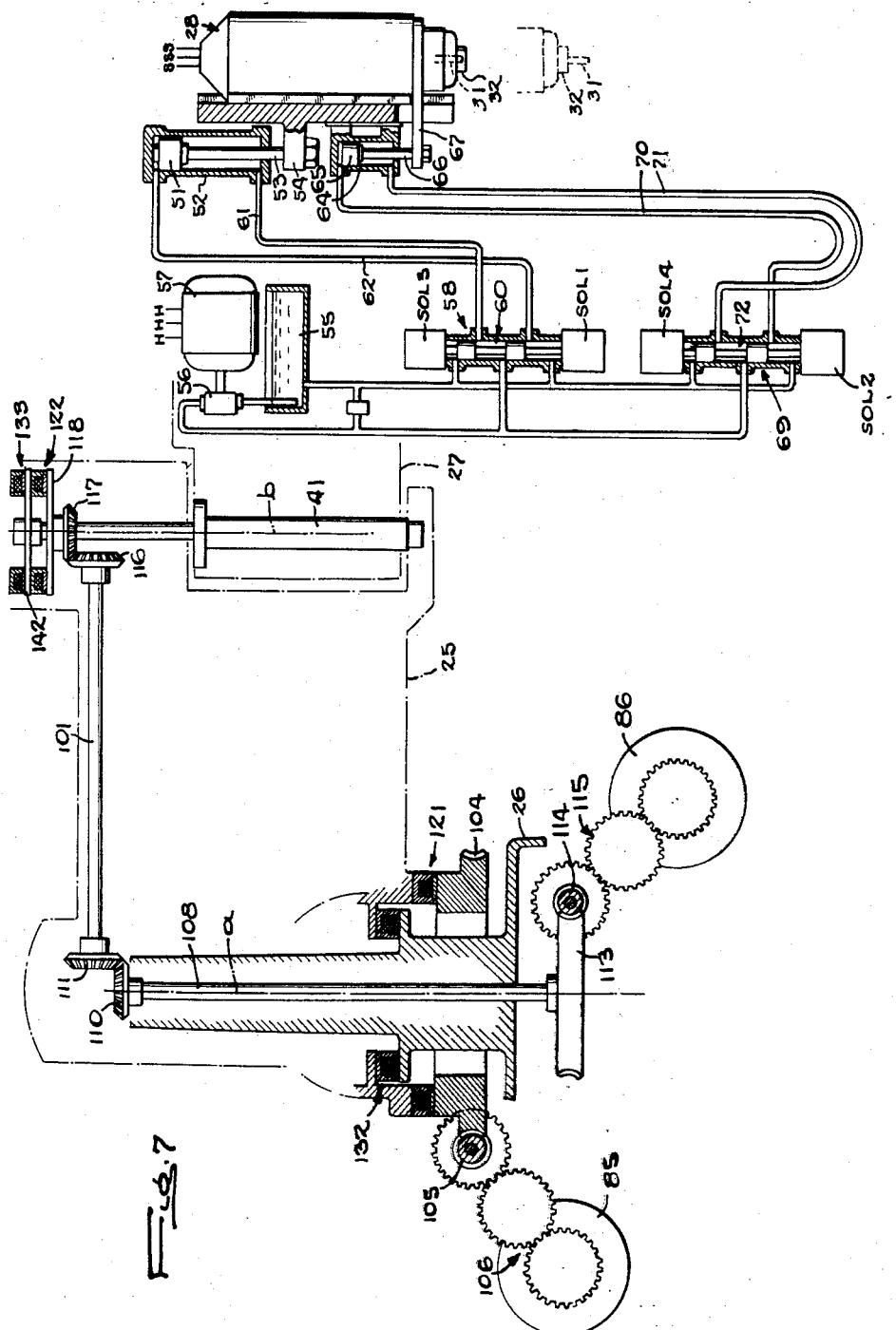
Fig. 7 is a schematic side view of the router showing the means for transmitting the torques to the arms and the mechanism for raising and lowering the tool head.

While the invention, in certain of its aspects, is applicable to various types of machine tools in which two members are driven along separate paths by indivdual power actuators, it is shown in the drawings for purposes of illustration as embodied in a double arm router comprising an elongated horizontal inner arm 25 pivotally mounted at one end to a stationary base 26 to swing about an upright axis *a* and a similar outer arm 27 pivotally connected at one end to the outer end of the inner arm to swing about a second vertical axis *b*. On the free end of the outer arm is a tool head 28 supporting a vertical spindle 29 rotated by a motor 30 (Figs. 7 and 11). A tool 31 such as an ordinary milling cutter is fast on the lower end of the spindle and a circular template follower 32 is mounted on the head 28 above the cutter and concentric with the spindle.

As is conventional in using a router of this type, the workpiece 33 (Fig. 11) is clamped to the top of a table 34 and a pattern or template 35 is bolted to the work, the latter being separated from both the table and the pattern by suitable spacers 36. The follower 32 then is brought up against the template and moved around the template periphery to guide the tool 31 through the work and cut the latter to a shape corresponding to the pattern of the template.

Figure 6:
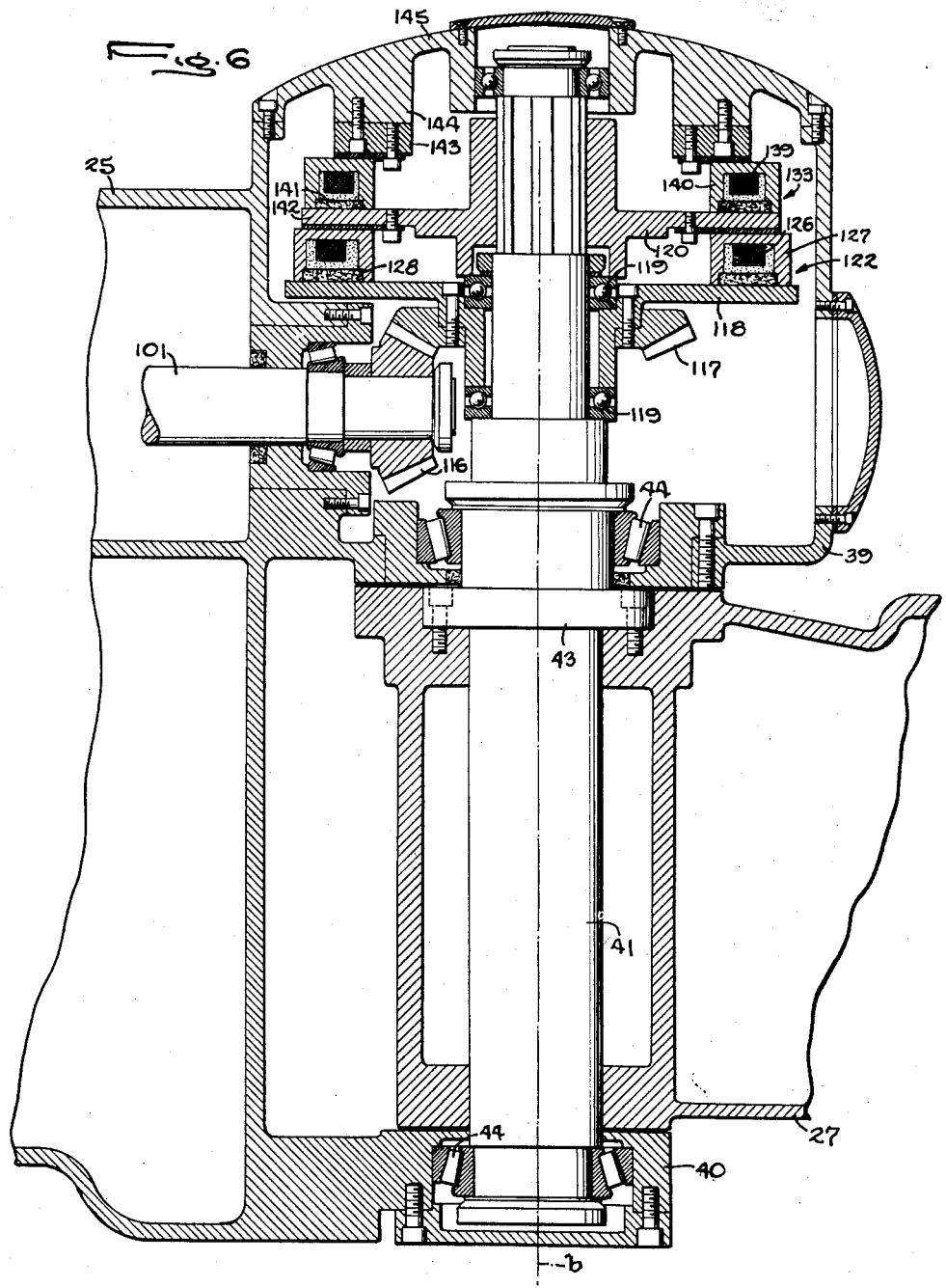
Fig. 6 is an enlarged fragmentary sectional view taken along the line 6—6 in Fig. 4.

Herein, the inner end of the inner arm 25 is a hollow casting journaled by means of vertically spaced bearings 37 (Fig. 5) on a hollow post 38 upstanding from and bolted to the top of the base 26. At its outer end, the inner arm is forked (see Fig. 6) and the inner end of the outer arm 27 is disposed between the spaced portions 39 and 40 projecting from the forked end of the inner arm. The outer arm is secured to a vertical shaft 41, as by bolts 42 projecting through a collar 43 on the shaft and threaded down into the arm, and the shaft is disposed along the axis *b* and spans the projecting arm portions 39 and 40 in which it is journaled by bearings 44. In this way, the shaft and hence the outer arm swing relative to the inner arm about the axis *b* while the two arms swing together on the post 38 about the axis *a* so that the arms may be flexed to permit the follower to be guided around the template 35.

The head 28 comprises a hollow cylindrical casing 45 (Figs. 11 and 12) sliding in vertical dovetail ways 46 on the free end of the outer arm 27. The head slides between upper and lower limit positions as determined by adjustable stops 47 threaded into vertically spaced brackets 48 which are bolted to one side of the outer arm at the free end thereof. These stops are engaged by an abutment 49 in the form of a finger on the end of a boss 50 integral with the casing. Sliding of the head is achieved by means of a piston 51 reciprocating in an upright cylinder 52 (Fig. 7) and connected to the casing by the piston rod 53 which is bolted to a boss 54 on the back of the casing. Pressure fluid is delivered from a sump 55 selectively to the head end and the rod end of the cylinder by a pump 56, driven by a motor 57, through a solenoid valve 58. The latter is double acting and is actuated alternately by two solenoids SOL-1 and SOL-3 whose energizing circuits include a suitable source 59 of alternating current (Fig. 19). When the solenoid SOL-3 is energized, the valve spool 60 is in the positon shown in Fig. 7 and pressure fluid is delivered to the rod end of the cylinder through the valve and a line 61 while fluid from the head end drains back to the sump through a line 62 and the valve. Thus the head is raised and held in its upper position away from the work 33. By energizing the solenoid SOL-1, the valve is reversed with the spool down and pressure fluid is directed to the head end of the cylinder through the line 62 so that the head is lowered.

Preferably the arrangement is such that the tool may be retracted out of engagement with the workpiece 33 while the follower is still in contact with the template 35 so that there is no danger of the tool nicking or gouging the work during withdrawal. For this purpose, the spindle 29, in addition to being carried by the casing 45, is verticallly reciprocable relative to the casing so that the follower 32 may be mounted on the casing while the cutting tool 31 is on the spindle. Herein, the follower is a ring pressed onto the lower reduced end of the casing and the spindle is coaxial with the ring to be shifted between a retracted position within the casing and a projected or active position, these positions being shown in full and broken lines respectively in Fig. 7. The spindle is fast on the shaft of the motor 30 and the housing of the latter is accurately machined to slide in the bore 63 (Fig. 11) of the casing and thereby shift the spindle between its two positions.

In order to slide the motor 30 and the spindle 29 up and down within the casing 45, an upright cylinder 64 is bolted to the side of the casing and a piston 65 sliding within the cylinder is rigidly attached to the motor housing by the piston rod 66 which is bolted to an ear 67 projecting laterally from the housing and through an elongated vertical slot 68 in the casing. The pump 56 also is utilized to deliver pressure fluid to the cylinder 65 through a solenoid valve 69 (Fig. 7) and fluid lines 70 and 71 leading respectively to the head and rod ends of the cylinder. By energizing selectively the solenoids SOL-2 and SOL-4 of the valve, the spool 72 is shifted down or up to direct the fluid either to the head or rod end of the cylinder and shift the motor and hence the spindle 29 down or up in the casing.

The valves 58 and 69 are operated in the proper sequence to lower the head 28 and then the spindle 29 or to raise the spindle and then the head simply by the selective operation of two push button switches 73 and 74 (Fig. 19). Thus, when both the head and the spindle are in their upper positions, the head is lowered and then the spindle is fed down into the work position by depressing and holding closed the "Head Down" push button switch 73. This completes the circuit of a relay 5CR whose contacts 5CR-1 close the circuit of the solenoid SOL-1 which, as just described, causes the head to be lowered.

When the head 28 reaches its lowermost position, the solenoid SOL-2 is energized to actuate the valve 69 for lowering the spindle 29. For this purpose, a limit switch LS-1 which is secured to a strap 76 spanning the brackets 48 and which is in the circuit of the solenoid SOL-2 is closed by the finger 49 engaging the actuator 75 of the switch. At this time, the spindle 29 is still in its upper position and, in this position, a bracket 77 bolted to the ear 67 on the housing of the motor 30 engages the actuator 78 of a limit switch LS-2 which is secured to the head outside the casing 45. The limit switch LS-2 completes the circuit of a relay 7CR and the contacts 7CR-2 of this relay, which are in the circuit of the solenoid SOL-2, are closed. Also in the circuit of the solenoid are the normally closed contacts 4CR-2 of a relay 4CR which is deenergized since the "Head Up" switch 74 in the circuit of this relay is open. With the limit switch LS-1 and the contacts 4CR-2 and 7CR-2 closed, the solenoid SOL-2 is energized and shifts the spool 72 of the valve 69 to the position in which the spindle is lowered. As the spindle starts down, the limit switch LS-2 is reopened deenergizing the relay 7CR. At this time, however, both solenoids SOL-2 and SOL-4 are deenergized and hence the valve spool 72 remains in position for lowering of the spindle.

When the "Head Up" switch is depressed, first the spindle 29 and then the head 28 is raised. To this end, the switch 74, through conductors 79 and 80, completes the circuit of the solenoid SOL-4 which shifts the spool 72 of the valve 69 to raise the spindle. When the latter reaches the upper position, the bracket 77 engages the actuator 78 to close the limit switch LS-2 so that the relay 7CR is energized again. At the same time, a normally closed limit switch LS-3, which is mounted on the strap 76, is closed by engagement of the finger 49 and the switch actuator 84a when the head is up and, together with the normally closed contacts 5CR-2 of a relay 5CR, completes the circuit of the relay 4CR. With the relays 4CR and 7CR energized, the contacts 4CR-1 and 7CR-1 of the relays are closed to complete the circuit of the solenoid SOL-3 through the conductor 80 and the push button switch 74. When energized, the solenoid shifts the valve spool 60 to cause the head 28 to be raised.

Figure 22:
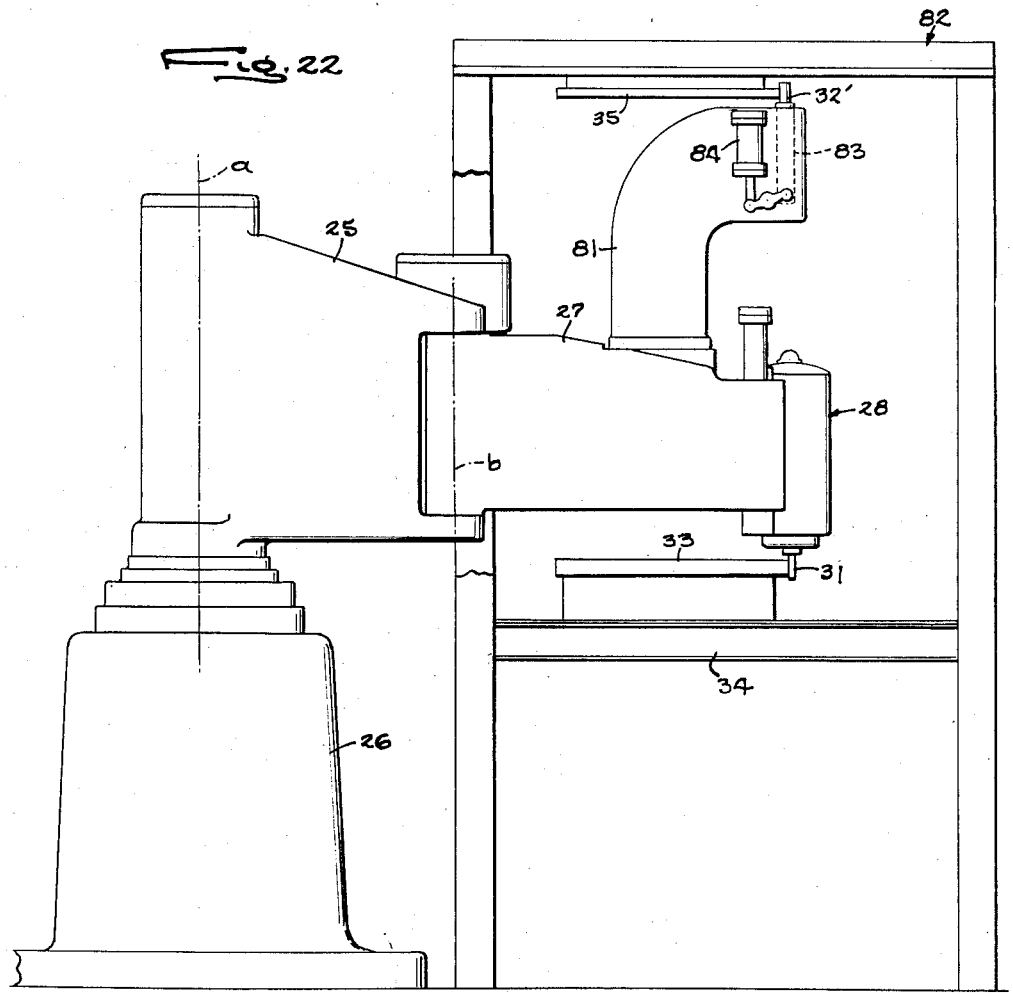
Fig. 22 illustrates a modified form of the invention.

In some instances, it is desirable to mount the template 35 remote from the workpiece 33. To this end, a template follower 32' (Fig. 22) may be mounted above the head 28 on an L-shaped casting 81 projecting upwardly from the center of the outer arm 27 and forwardly. The follower is mounted on the outer end of the casting and, like the follower 32, is coaxial with the tool 33. In this case, the template is disposed above the casting and is clamped to the top of a framework 82 which is integral with and extends up above the work table 34. As illustrated in the drawings, the follower 32' is separated from the head and may be the reduced upper end of a vertical rod 83 slidably mounted in the casting and retracted and projected for engagement with the template by a suitable power actuator 84. As will be seen later, the operation of this form is the same as in the preferred embodiment of the invention.

Swinging of the arms 25 and 27 about their axes a and b is effected by two power actuators 85 and 86 (Fig. 1), herein reversible variable speed direct current motors, and each motor is individually connected to one of the arms, the motor 85 driving the inner arm 25 and the motor 86 driving the outer arm 27. The two motors are driven simultaneously but the direction of rotation and the degree of energization of each are controlled separately. As a result, the torques tending to swing the arms may be of selected magnitudes and directions. These torques combine to produce a resultant force acting on the follower 32 and the tool 31. By controlling the energization of the motors, the direction of the resultant force may be varied to feed the tool around the template 35 while holding the follower against the edge of the template.

To energize the motors 85 and 86 selectively to produce the desired resultant force, both motors are controlled by a common selector 87 (Fig. 2) which is manually operable and herein is disposed at a station remote from the router proper. The selector may be mounted on a separate standard 88 and is movable in a plurality of directions from a normal upright or neutral position in which both motors are deenergized, the motors being energized in accordance with the movement of the selector from the neutral position.

In the form illustrated, the selector 87 comprises a normally vertical rod 89 (Figs. 9 and 10) swiveled in a hollow arm 90 of the standard 88 by means of a ball and socket joint 91. The socket 92 of the latter is formed by a centrally apertured plate 93 extending across the interior of the arm 90 and a concentric ring 94 bolted to the top of the plate, the plate and the ring being oppositely beveled around their center holes to define the socket, while the ball 95 is a spherical enlargement on the rod 89 above the lower end thereof. The rod projects up through an opening 95 in a dome 97 on the arm 90 and a handle 98 is received on the upper end of the rod and fastened thereto by a set screw 99. At the lower end of the handle is a spherical flange 100 mating with the dome 97 to close the hollow arm 90 while permitting the rod to swivel within the limits defined by the hole 96.

In order that both motors 85 and 86 may be mounted stationarily instead of on the arms 25 and 27 so that the motors are readily accessible and easily connected to their respective control systems, the arms are turned by the corresponding motors through a novel transmission means. With this means, the motor 86 for the outer arm 27 as well as the motor 85 for the inner arm 25 may be mounted on the base 26. In the case of the outer arm, the transmission means includes a rotary member 101 (Figs. 5, 6 and 7) extending along the inner arm and coupled at its inner end to the motor 86 and at its outer end to the outer arm so that, in effect, the motor acts between the two arms even though it is mounted on the base. The transmission for the inner arm is a substantially direct coupling between the motor 85 and the arm and this motor, therefore, acts between the base and the inner arm.

In the present instance, the inner arm transmission includes a sleeve 102 (Fig. 5) encircling the post 38 and bolted to the underside of the arm 25 to turn with the latter in the bearings 37 about the axis a. Coupled to the sleeve is a ring 103 which is concentric with and journaled on the outside of the sleeve. A worm wheel 104 bolted to the ring meshes with a worm 105 journaled on the base 26 and driven through a gear train 106 by the motor 85, the latter being bolted to one side of the base. As a result, the motor 85, when energized, turns the inner arm through the gear train, the worm, the ring and the sleeve.

The rotary member 101 through which the motor 86 turns the outer arm 27 herein is an elongated horizontal shaft extending throughout the length of the inner arm and journaled on the latter in spaced bearings 107 (Figs. 5 and 6) to be disposed above the upper end of the post 38. Within the post is a vertical shaft 108 journaled in bearings 109 and coupled at its upper end to the inner end of the shaft 101 by bevel gears 110 and 111 fast on the respective shaft ends. At its lower end, the shaft 108 is keyed to a ring 112 which is bolted to a worm wheel 113. Meshing with the wheel is a worm 114 journaled on the base 26 and driven through a gear train 115 (Fig. 7) by the motor 86, which is bolted to the side of the base, so that the motor turns the shaft 101 through the worm and wheel 114 and 113, the shaft 108 and the gears 110 and 111.

To swing the outer arm 27 in response to turning of the shaft 101, a bevel gear 116 (Figs. 6 and 7) fast on the outer end of the shaft meshes with a bevel gear 117 disposed within the hollow projection or housing 39 on the end of the inner arm and bolted to a flat ring 118. The latter is journaled on the vertical shaft 41 by means of ball bearings 119 and is coupled to a second and concentric ring 120 disposed above the first and splined to the upper end of the shaft. As a result, the shaft 41 to which the outer arm is fixed is turned and hence the arm is swung when the shaft 101 is turned by the motor 86.

In order to swing the arms 25 and 27 about their axes when the motors 85 and 86 are energized but prevent damage to the router when excessive loads are applied to the arms as by sudden stopping, starting or reversing of the motors, friction couplings 121 and 122 (Figs. 5, 6 and 7) are interposed in the transmission for each arm. Each coupling comprises two relatively rotatable and frictionally engageable elements which, when normal loads are applied to the arms, rotate together but slip when loads above a predetermined value are applied. The couplings may, as illustrated, be friction clutches which are engaged when the motors 85 and 86 are conditioned for actuation and herein are clutches of the electromagnetic type.

In the transmission for the inner arm 25, the clutch 121 is interposed between the ring 103 and the sleeve 102 (Fig. 5) and is formed by an annulus 123 of U-shaped radial cross section made of magnetic material and bolted to the underside of a radial flange 124 on the sleeve 102. The legs of the U constitute the pole pieces of the magnet and disposed between the legs is an energizing coil 125. A ring 126 of wear material bridges the ends of the legs and opposes a flat magnetic annulus 127 which is bolted to the top of the ring 103 and serves as the armature of the clutch. When the coil is energized, the armature is drawn into frictional gripping engagement with the wear ring so that the sleeve 102 and hence the inner arm turns.

with the ring 103 but may slip relative to the ring under excessive loads since the ring is journaled on and may turn relative to the sleeve. Normally, the coil 125 is energized continuously during use of the router. A similar clutch 122 disposed within the housing 39 is employed in the transmission for the outer arm 27 and includes a coil 126 (Fig. 6) disposed within a U-shaped annulus 127 which is bolted to the underside of the ring 120 while a wear ring 128 frictionally engages the ring 118 which constitutes the clutch armature. Due to the ball bearings 119, the ring 118 may turn relative to the ring 120 but normally the two turn together under the action of the clutch 122.

Both clutch coils 125 and 126 are energized from a source of direct current and, in this case, the coils are connected in parallel across the output of a rectifier 129 (Fig. 20) which, in turn, is connected to the source 59 (Fig. 19) of alternating current. In the coil circuits are rheostats 130 and 131 which may be adjusted manually to limit the current flowing through the coils to a value such that the clutches 121 and 122 slip whenever the loads applied to the arms 25 and 27 exceed a maximum safe value. Contacts ESR-3 and ESR-4 in the circuits of the coils 125 and 126 respectively are normally open and are part of a relay ESR (Fig. 19) which is energized through the normally open contacts 1RR-6 of a run relay 1RR. As will be described later, the latter relay is energized when the machine is prepared for operation.

Due to the substantial lengths of the arms 25 and 27, backlash in the transmissions between the arms and their motors 85 and 86, such as in the worms and wheels 105, 106, 113 and 114 and the bevel gears 110, 111, 116 and 117, is magnified considerably. As a result, there is a tendency for the follower 32, as it accelerates, decelerates or changes direction, to leave the template 35. To overcome this objectionable tendency, means are provided to apply an initial load to the arms while the latter are swinging and the load thus applied takes up the backlash and causes the follower to move accurately along the periphery of the template. Herein, these means are friction brakes 132 and 133 (Figs. 5, 6 and 7) engaged while the arms are swinging to produce a torque which tends to restrain turning of the arms.

In the form illustrated, the brakes 132 and 133 are of the electromagnetic type and are energized upon movement of the selector 87 to produce the restraining torques. The brake 132 for the inner arm comprises a ring 134 of magnetic material with a U-shaped radial cross section encircling the post 38 and bolted to the underside of the arm to turn with the latter. Disposed within the ring is in energizing coil 135 and an annulus 136 of friction wear material bridges the legs of the U and frictionally engages a stationary armature 137 which is in the form of a radial flange on the upper end of a sleeve 138 keyed to the post 38. When the selector 87 is moved away from its neutral position, the brake coil is energized to bring the wear annulus 136 and the armature into frictional gripping engagement but the coil energization is such that these frictionally engaged parts slip relative to each other to produce a force retarding but permitting swinging of the inner arm.

The brake 133 which is within the housing 39, is similarly engaged upon movement of the selector 87 and exerts a retarding force on the outer arm 27. Like the brake 132, the brake 133 includes a coil 139 (Fig. 6) disposed within an annular core 140 of U-shaped cross section and a wear ring 141 spanning the legs of the core and opposing a flat armature ring 142. The core is bolted through the intermediary of a ring 143 to the underside of an annular flange 144 depending from the inside of a circular cover 145 which is bolted to the top of the housing 39 integral with the inner arm 25 and enclosing the transmission for the outer arm. The armature 142 is the peripheral portion of the ring 120 and thus the armature is rigid with the shaft 41 to which the outer arm is fixed. With the core rigid with the inner arm and the armature attached to the outer arm, the brake 133, when the coil 139 is energized, tends to retard the swinging of the outer arm relative to the inner arm.

Preferably, the brakes 132 and 133 are only partially energized when the arms 25 and 27 are swinging, that is, only a part of the full current flows through the brake coils 135 and 139 when the selector 87 is shifted away from its neutral position. Advantage is taken of the presence of the brakes and the fact that they need be only partially energized to utilize the brakes for the additional function of locking the arms in whatever position they may be when the selector is returned to the neutral position. This is achieved by energizing each of the coils 135 and 139 of the brakes through two parallel circuits (see Fig. 20) one of which contains a resistance limiting the current flow through the coil while the other one is normally open but is closed when the selector is in the neutral position to shunt out the resistance and cause full energization of the brake.

Herein, the resistance limiting the current flow through the coil 135 is a rheostat 147 which may be set manually to determine the degree of energization of the brake 132 and hence the magnitude of the retarding force applied to the inner arm 25 when the shunt circuit is open. A similar rheostat 148 is used to set the retarding force for the outer arm 27. The circuit shunting the rheostat 147 includes normally open contacts BCR-1 and similar constacts BCR-2 are connected in parallel with the rheostate 148 so that, when these contacts are closed, they shunt out the rheostats and cause full energization of the brakes.

The contacts BCR-1 and BCR-2 are part of a relay BCR whose coil is energized by the selector 87 when in the neutral position. For this purpose, the selector closes a self-contained switch 149 such as is sold under the name Microswitch as it reaches the neutral position and the switch completes the circuit of the relay coil. As shown in Fig. 9, the switch 149 is disposed in the hollow arm 90 of the standard 88 and its casing is clamped to a U-shaped bracket 150 which is bolted to the underside of a web 151 spaced below and supporting the plate 93. The switch is below the selector rod 89 and the actuator 152 of the switch is concentric with the rod and projects up for engagement with the lower end 153 of the latter when the selector is in the center or neutral position. Thus, when the selector is centered to deenergize both motors 85 and 86, the switch 149 is closed energizing the relay BCR and closing the contacts BCR-1 and BCR-2 so that the rheostats 147 and 148 are shunted and the brakes 132 and 133 are fully energized to lock the outer arms 25 and 27.

If desired, each of the brake coils 135 and 139 may be provided with a second shunt circuit which is closed when the spindle 29 and the head 28 are being raised so that the brakes 132 and 133 are fully energized and the arms 25 and 27 are locked at that time. For this purpose, the second shunt circuits are completed by normally closed contacts 4CR-4 and 4CR-5 of the relay 4CR which as described above, is energized when the "Head Up" push button switch 74 is closed, the relay 5CR is deenergized and the limit switch LS-3 is closed.

As a precautionary measure and to relieve any wind up in the transmissions for the arms 25 and 27 during raising of the head 28, the "Head Up" push button switch 74 may also, through the medium of the relay 4CR, deenergize the clutches 121 and 122 so that the follower 32 is not pressed against the template 35 when the head is raised. Herein, this is achieved conveniently by means of normally closed contacts 4CR-3 which are in the circuit of the relay ESR and are opened upon energization of the relay 4CR. Opening of the contacts deenergizes the relay ESR and thus the contacts ESR-3 and ESR-4 in the circuits of the clutch coils 125 and 126 are opened deenergizing the clutches. If desired, suitable overload safety devices, indicated generally at 155 in Fig. 19 may be placed in the circuit of the relay ESR to cause the clutches to be deenergized in the case of such an electrical overload.

As explained previously, a resultant force is applied to the follower 32 and the tool 31 by the motors 85 and 86 and the direction of this force is determined by the direction of movement of the selector 87 away from its neutral position. Not only the direction of the resultant force but also its magnitude is controlled and this simply in response to the amount of movement of the selector from its neutral position. Further, a wide range of directional control of the force is obtained by arranging the selector for movement in all directions within a predetermined angle, which herein is a complete circle, and by energizing the arm motors in different proportions for the various directions of selector movement so that the direction of the resultant force is correlated to the direction in which the selector is shifted. Thus, when the selector is moved in a given direction, the motors are energized in a predetermined ratio which produces a resultant force in the desired direction. As the selector is moved further from its neutral position but in the same direction, the energization of the motors is increased but the ratio of energization remains the same so that the magnitude of the force is increased while the direction remains unchanged. In this way, the force may be applied selectively in an infinite number of directions and, at the same time, the magnitude of the force may be increased or decreased as desired.

To the foregoing ends, the selector 87 is operatively connected to two movable control members 156 and 157 (Fig. 8) which are shifted by the selector and which control the energization of the motors 85 and 86 respectively, this energization being proportional to the amount the control members have been shifted. The connection 158 between the members and the selector is such that, when the selector is moved in each direction, the members are shifted differentially and in the proper ratio to energize the two motors to the degrees necessary to produce a resultant force in a direction corresponding to the direction of selector movement. This ratio of movement of the members is maintained as the selector is moved further from the neutral position but such further movement shifts the members additional amounts producing a proportional increase in the energization of the motors.

Each of the control members 156 and 157 has a neutral position in which it is held by the selector 87 when the latter is in its neutral position. With the members and the selector in their neutral positions, both motors 85 and 86 are deenergized and there is no force applied to the tool 131 and the follower 132. When the selector is moved, the members are shifted away from their neutral positions. As each member is shifted to one side of its neutral position, the corresponding motor is energized in one direction and this energization increases as the member moves farther from the neutral position while, when the member is shifted to the other side of the neutral position, the motor is reversed. Thus, movement of the selector controls both the direction and degree of energization of the motors 85 and 86.

In the present instance, the control members 156 and 157 are rods radiating from the selector 87 and mounted in a plane normal to the neutral axis of the selector to shift longitudinally. The connection 158 between the rods and the selector shifts the former an amount proportional to the component of selector movement in the longitudinal direction of each rod, that is, each rod is shifted a distance correlated to the cosine of the angle between the axis of the rod and the direction in which the selector is moved. Differential movement of the rods is obtained by disposing the rods at an angle with respect to each other and, preferably, this is a right angle. As illustrated in Figs. 8 and 10, the rods 156 and 157 may be mounted in the standard 88 and project into the arm 90 on the standard through radial holes 159 in the web 151. Each rod is supported for longitudinal sliding by axially spaced reduced sections 161 and 162 of a sleeve 163 which encircles the rod and has its inner end pressed into one of the holes 159. The rods 156 and 157 and the corresponding sleeves 163 extend outwardly beyond the web 151 and project respectively into the standard 88 and into a casing 164 on one side of the hollow arm 90.

Herein, the connection 158 between the selector 87 and the inner ends of the rods 156 and 157 comprises a plate 165 which is moved by the selector and abuts against the rod ends. The plate is disposed between the web 151 and the plate 93 and the latter serve as guides holding the plate in a plane perpendicular to the vertical axis of the selector while permitting the plate to be shifted radially in all directions from this axis. At its center, the plate 165 is formed with a hole 166 receiving a spherical enlargement 167 on the selector rod 89 below the ball joint 91 so that the plate moves in the opposite direction to the tilting of the selector and is shifted a distance correlated with the angle to which the selector is tilted.

The four corners of the plate 165 are beveled to form abutment surfaces 168 and compression springs 169 acting between these surfaces and stationary abutments 170 bias the plate toward its normal or inactive position in which it is centered about the vertical axis of the selector 87. The stationary abutments may, as illustrated, be short rods disposed in sleeves 171 which are threaded into radial holes 172 in the corners of the arm 90. The rods are held in place by set screws 173 and lock screws 174 and their inner ends are reduced to receive one end of each spring 169 while the other ends of the springs are received on pins 174 projecting radially from the corners of the plate 165. Since the springs tend to center the plate, they also urge the selector 87 toward its neutral position and thus tend to return the control rods 156 and 157 to their neutral positions.

To shift the control rods 156 and 157 in response to tilting of the selector 87, the inner ends of the rods abut against the opposing edges 175 and 176 of the plate 165. The rods are held against these edges by compression springs 177 encircling the rods and acting between the reduced section 161 in the sleeve 163 and a head 178 on the inner ends of the rods. With this arrangement, the plate surfaces 175 and 176 shift the rods 156 and 157 axially a distance equal to the component of plate movement longitudinally of the rods and slide on the heads 178 an amount corresponding to the component of movement perpendicular to the axis of the rods.

The relationship of the selector 87 and the control rods 156 and 157 is such that the motors 85 and 86 are energized in the proper ratio to move the tool 31 and the follower 32 generally in the same direction in which the selector is tilted. In normal use of the router, the arms 25 and 26 are roughly in the position shown in Fig. 3 so that the tool and follower are moved transversely (to the left and right as viewed in Fig. 3) upon swinging of the inner arm and are advanced in the perpendicular direction by swinging of the outer arm. Accordingly, control rod 156 whose axis extends transversely of the machine, is used to control the inner arm motor 85 while the rod 157 controls the outer arm motor 86. Since the plate 165 moves in a direction opposite to that of the selector, shifting of the control rod 156 to the left (up in Fig. 8) energizes the motor 85 in the direction to swing the inner arm counterclockwise as viewed in Fig. 3 while shifting the rod to the right reverses the motor to swing the arm clockwise. The control rod 157 similarly energizes the outer arm motor.

It will be seen that the motor 85 produces the principal force for moving the tool 31 to the left or right while the motor 86 produces the main force for moving the tool toward and away from the operator. In order to hold the follower 32 against the template 35 when moving in either of these directions, both motors are energized. That is, when the selector 87 is moved to the left or right, the inner arm motor 85 is energized to a comparatively high degree to move the tool in the corresponding direction and, at the same time, the outer arm motor 86 is energized slightly to urge the outer arm toward the template. Similarly, the inner arm motor is energized slightly to turn the inner arm toward the template when the selector is moved toward or away from the operator.

To achieve the foregoing ends, the edges 175 and 176 of the plate 165 are inclined as shown in Fig. 8 so that each of the rods 156 and 157 is shifted a short distance when the selector is tilted in a plane perpendicular to the axis of the rod. Herein, both edges are inclined inwardly toward the center of the plate when going around the plate in clockwise direction. Thus, when the selector is tilted along the axis of the rod 156 (to the left or right in Fig. 3) both rods are shifted in the direction to turn the respective arms in the same direction, that is, both arms turn either clockwise or counterclockwise. When the selector is tilted along the axis of the rod 157, the arms swing in opposite directions, one clockwise and the other counterclockwise. As will be seen later, inclining the edges 175 and 176 of the plate 165 in this manner holds the follower 32 against the template 35 when the tool is fed counterclockwise around the outside of the template or clockwise around the inside.

With the foregoing arrangement, the selector 87 moves the control rods 156 and 157 progressively away from the neutral positions of the rods in one direction or the other. By virtue of this arrangement, it is possible to apply torques of progressively varying magnitudes to the arms 25 and 27 through the use of reversible electric motors 85 and 86 which develop torques of magnitudes proportional to the distances the rods are moved from the neutral positions and in directions corresponding to the direction the rods move. This is achieved by utilizing the control rods to produce signals which vary according to the positions of the rods and which effect a corresponding energization of the motors.

In the present instance, movement of the rods 156 and 157 produces electrical signals and this may, as illustrated, be achieved by changing the reactance of two reactor elements 179 and 180 (Figs. 8 and 21) which herein are inductive. To this end the rod 156 supports at its outer end a core 181 which is disposed within the inductance coil 182 of the reactor 179 and moves with the rod while a core 183 is similarly carried by the rod 157 within the coil 184 of the reactor 180. As shown in Fig. 8, the cores are midway between the ends of their respective coils when the selector 87 and hence the rods 156 and 157 are in their neutral positions. Each inductance coil is part of a suitable phase shifting and discriminating network, illustrated schematically at 185 and 185' in Fig. 21, having a unidirectional output whose magnitude varies in accordance with the axial position of the corresponding reactor core. The magnitude of the output of each network, that is, of the variable signal produced by movement of the selector, varies from a minimum when the core is at one end of its coil to a maximum when the core is at the other end and varies in generally a straight line so that the output is half the maximum value when the core is centered between the coil ends.

To energize the motors 85 and 86 in accordance with the positions of the reactor cores 181 and 183, shunt wound direct current motors are employed and the voltage through the armature windings and the stabilizing series windings 186 and 186' of these motors is varied in response to movement of the cores while the voltages through the shunt field windings 187 and 187' are constant and are applied by a suitable direct current source 188 (Fig. 20) connected across the alternating current source 59. In the case of the motor 85, the voltage through the armature winding is developed by a generator 189 whose output is varied both in direction and magnitude according to the signal of the reactor 179, that is, the output of the phase shifting and discriminating network 185. By controlling the voltage through the armature winding, the reactor controls the speed of the motor and hence the torque applied to the inner arm 25.

The generator is driven continuously and at a constant speed during use of the router by an alternating current motor 190 connected as indicated at G—G—G in Figs. 19 and 21 to power lines 190a supplied by a suitable three phase alternating current source (not shown). The output voltage of the generator 189 is varied by changing the generator field in response to the signal of the reactor 179 so that the output voltage of the generator varies from zero when the core 181 is in its neutral position to a maximum value of one polarity as the core is shifted to its limit position in one direction from the neutral position and to a similar value but of the opposite polarity as the core is moved to its limit position in the opposite direction from the neutral position. For this purpose, two generator field windings 191 and 192 are used. The current flowing through the former is supplied from the direct current supply 188 and is constant so that, when current is flowing through only this winding, the generator output voltage is a maximum of one polarity, for example, 230 volts negative.

In the other generator field winding 192, which is the control field winding, the current produces a flux which opposes the flux produced by the winding 191 and this current is varied in response to movement of the core 181 so that the field resulting from the two windings is varied in accordance with the position of the selector 87. This is achieved by varying the voltage applied to the control field winding from zero to a maximum in response to movement of the core from one end of the coil 182 to the other. The number of turns in the control field winding 192 is correlated with the turns in the winding 191 so that the two windings balance each other and the generator output is zero when the core is in the neutral position. Thus, as the voltage through the winding 192 is increased from zero to the maximum, the field flux resulting from the two windings decreases from a maximum in one direction to zero and then it reverses and increases to a maximum in the opposite direction. As a result, the output voltage of the generator changes accordingly and, in the present instance, varies from 230 volts in the negative sense through zero to a plus 230 volts.

The current in the control field winding 192 is varied by the reactor 179 and is correlated with the position of the core 181 so that, when the core is in the neutral position, the two field windings balance each other and the output of the generator 189 is zero. When the core is shifted to one side or the other of its neutral position, the current in the control field winding is increased or decreased with a corresponding increase in the generator output. In this way, the selector 87 through the core 181 controls the direction and degree of energization of the motor 85 and hence the direction and the magnitude of the torque applied to the inner arm 25. Herein, the current in the control winding 192 decreases as the core is moved from the neutral position toward the operator (down in Fig. 21) to cause the motor 85 to turn the arm 25 counterclockwise while the current increases and the arm swings clockwise when the core is moved in the opposite direction.

To vary the voltage in the control field winding 192 in response to movement of the core 181, a portion of the reactor signal, that is, the output voltage of the phase shifting and discriminating network 185, is fed into a suitable voltage regulator 193 which in turn controls the voltage applied to the winding. The input to the voltage regulator also includes a signal responsive to the load on the tool so that, as the load increases or decreases, the regulator compensates for this by increasing or decreasing the voltage applied to the control field winding 192 to maintain the motor running at a constant speed corresponding to the selected position of the reactor core. A third signal fed to the voltage regulator is a biasing signal and is set initially whereby the voltage applied by the regulator to the winding 192 when the reactor core is in the neutral position produces a flux which exactly balances the flux produced by the winding 191.

The portion of the reactor signal applied to the voltage regulator 193 is determined by the setting of a potentiometer 194 connected across the output of the phase shifting and discriminating network 185. A similar potentiometer 195 connected across the output of a suitable rectifier 196 is used to produce the biasing signal. The signal responsive to the load characteristics is a feedback signal and is proportional to the voltage drop across a resistor 197 connected to the output of the generator 189 in parallel with the armature of the motor 85. The three signals which constitute the input to the regulator are applied to a closed circuit composed of the potentiometers 194 and 195 and the resistor 197. This circuit extends from a terminal 198 of the regulator through a conductor 199, the resistor 197, contacts 6CR–1, the potentiometer 194, conductors 200, 201 and 202, the potentiometer 195 and contacts 6CR–2 to the terminal 203 of the regulator. Standby circuits 204 and 205 are connected in parallel with the potentiometers and their respective contacts so that there always is an input to the regulator to maintain the latter in its operating range. Also applied to the regulator is the signal from a second circuit which extends between the terminal 198 and a third terminal 206 and which includes a resistor 207 to limit the output of the regulator and prevent the current in the armature of the motor 85 from exceeding a predetermined value under overload conditions.

A similar control system energizes the inner arm motor 86 in accordance with the movement of the core 183 of the reactor 180 and the corresponding parts of this system are indicated by the same but primed reference characters.

The control systems for the two arm motors 85 and 86 are conditioned for operation when the head 28 is both up and down so that the tool 31 may be traversed either above or through the work but these systems are rendered inoperative as the head and tool are moved up and down. For this purpose, the control and energizing circuits are prepared for operation by a relay ICR when the head is up and by a relay 2CR when the head is down and both relays are deenergized as the head is raised or lowered.

In the circuit of the relay ICR is a limit switch LS–4 which is mounted with and mechanically connected to the limit switch LS–3 so as to be closed only when the head 28 is up. The circuit of this relay includes in addition the contacts 1RR–7 of a relay 1RR which, as will be described later, is energized when the router is prepared initially for operation. Also in the circuit of the relay 1CR are normally closed contacts 5CR–3 of the relay 5CR and normally open contacts ESR–1 of the relay ESR which is energized by closing of the contacts 1RR–6 upon energization of the relay 1RR. The circuit of the relay 1CR is completed when the contacts 1VR–1 and 2VR–1 (connected at V—V in Fig. 19 and shown in Fig. 21) are closed. These contacts are normally closed and are parts of relays 1VR and 2VR which are connected respectively across the outputs of the generators 189 and 189' so that the relays are deenergized and the contacts are closed only when there is no output from the generators. In this way, the relays 1VR and 2VR prevent the energization of the relay 1CR when there is an output from the generators and hence insure that the motors 85 and 86 start at a low voltage. Thus, if the head is up and there is no output from the generators, the relay 1CR is energized.

When the relay 1CR is energized, it completes its own holding circuit through contacts 1CR–1, thus bypassing the contacts 1VR–1 and 2VR–1, and it closes contacts 1CR–2 in the circuit of a relay 6CR (Fig. 20). The latter circuit, therefore, is completed through the contacts 1CR–2, 1CR–1, 5CR–3 and ESR–1. When the relay 6CR is energized, it closes contacts 6CR–1, 6CR–2, 6CR–1' and 6CR–2' which close the input circuits to the regulators 185 and 185'. The relay 1CR also completes the circuits of the armatures of the motor 85 and 86. This is achieved by closing contacts 1CR–3 which, together with contacts ESR–2, complete the circuits of relays 1M and 2M (Fig. 20). The latter, when energized, close contacts 1M–1 and 2M–2 in the motor armature circuits. The relays 1M and 2M also open the normally closed contacts 1M–2 and 2M–1 which are in the dynamic braking circuits 208' and 208 of the motors. Thus, when the relay 1CR is energized, the control and motor circuits are closed and ready for operation.

As the head 28 is lowered, the limit switch LS–4 opens and the relay 1CR thereby is deenergized so that the motors 85 and 86 will not be operable even if the selector 87 is moved. When the head reaches its lowermost position, the control and motor circuits again are conditioned for operation by the relay 2CR. The latter is energized by closing of the limit switch LS–1 which is closed when the head is down and energizes a relay 3RR to close contacts 3RR–1 in the circuit of the relay 2CR. Like the circuit of the relay 1CR, the circuit of the relay 2CR is through the contacts 1VR–1 and 2VR–1 whereby the control and energizing circuits again are closed only if there is no output from the generators 189 and 189'. The relay 2CR functions in the same manner as the relay 1CR, that is, it completes a holding circuit through contacts 2CR–2 and energizes the relay 6CR and the motor relays 1M and 2M by closing contacts 2CR–1 and 2CR–3 respectively.

*Operation*

To prepare the router for use, the operator presses a "Control Start" push button switch 209 (Fig. 19) which energizes a relay 1N. The latter closes contacts 1N–1 and 1N–2 to complete the circuits from the lines 190a to the motors 190 and 190' for the generators 189 and 189' and closes contacts 1N–3 to energize the pump motor 57 for raising and lowering the head 28, this motor being connected to the three phase alternating current lines 190a as indicated at H—H—H. Contacts 1N–4 also are closed to complete a holding circuit for the relay. Next, the "Run" push button 210 is depressed completing the circuits of a pilot light 211 and the relay 1RR whose contacts 1RR–1 are closed in the circuit of a relay 2N while the contacts 1RR–2 completes a holding circuit for the relay 1RR. The contacts 1RR–3, 1RR–4, 1RR–5, 1RR–6 and 1RR–7 of this relay also are closed in the circuits of the relays 5CR, 4CR, BCR, ESR and 1CR respectively and thus condition these relays for energization.

Assuming that at this time the head 28 is up, the limit switch LS–3 is open so that the relay 4CR is deenergized. As a result, the contacts 4CR–3 are closed and, since the contacts 1RR–6 are closed, the relay ESR is energized. The latter relay closes the contacts ESR–1 in the circuit of the relay 1CR and contacts ESR–2 in the common circuit of the relays 1M and 2M and it also energizes the coils 125 and 126 of the inner and outer arm clutches 121 and 122 by closing the contacts ESR–3 and ESR–4.

With the head 28 up, the limit switch LS–4 is closed and the relay 5CR is deenergized so that its contacts 5CR–3 are closed. At the same time, the selector 87 is in the neutral position and there is no output from the generators 189 and 189'. Hence, the relays 1VR and 2VR (Fig. 21) are deenergized and the contacts 1VR–1 and 2VR–1 are closed completing the circuit of the relay 1CR (Fig. 19) the relay 1CR completes its own holding circuit through the contacts 1CR–1 and closes the contacts 1CR–2 in the circuit of the relay 6CR. It also closes the contacts 1CR–3 (Fig. 20) to energize the relay 1M and 2M which open the contacts 1M–2 and 2M–1 on the dynamic braking circuits 208 and 208' and close the contacts 1M–1 and 2M–2 thus completing the circuits of the armatures of the arm motors 85 and 86. The relay 6CR, being energized, the contacts 6CR–1, 6CR–2, 6CR–1' and 6CR–2' in the control circuits for the control field windings 192 and 192' of the generators close to condition these circuits for operation in response to movement of the selector 87. The operator then depresses a "Spindle Start" push button switch 212 to energize the relay 2N which, in turn, energizes the spindle motor 30 by closing the contacts 2N–1 and closes the contacts 2N–2 to complete its holding circuit, the motor being connected across the alternating current lines 190a as indicated at S—S—S in Figs. 7 and 19.

At this time, the generator motors 190 and 190', the pump motor 57 and the spindle motor 30 are running. The head 28 is up and the clutches 121 and 122 are engaged to transmit the torque developed by the motors 85 and 86 to their respective arms 25 and 27. The circuits for the arm motors are closed but, with the selector 87 in the neutral position, the flux of the control field windings 192 and 192' of the generators 189 and 189' balances the flux of the field windings 191 and 191' and the motors do not transmit a torque to the arms. Also, since the selector is in the neutral position, the microswitch 149 is closed and this energizes the relay BCR to close the contacts BCR–1 and BCR–2 in the shunt circuits of the brake coils 135 and 139 so that the brakes 132 and 133 are fully energized and hold the router arms against turning.

With the foregoing conditions, the operator may shift the selector 87 to traverse the tool 31 with the head up to position the tool properly over the work. Assuming, however, that the tool is over the point in the workpiece 33 where it is desired to begin a cut, the operator presses the "Head Down" push button switch 73 (Fig. 19) which energizes the relay 5CR. The contacts 5CR–1 of the latter close to energize the solenoid SOL–1 and this shifts the spool 60 (Fig. 7) of the valve 58 to admit pressure fluid to the head end of the cylinder 52 thus lowering the head 28. Since the spindle 29 is up as the head is being lowered, the limit switch LS–2 is closed so that the relay 7CR is energized and the contacts 7CR–2 are closed. As soon as the head is down, the limit switch LS–1 is closed and energizes the solenoid SOL–2 which shifts the spool 72 of the valve 69 to admit pressure fluid to the head end of the cylinder 64 and cause the tool 31 to be fed down into the work.

As the head 28 started down, the limit switch LS–4 was opened deenergizing the relay 1CR. This opens the circuits of the relay 6CR, 1M and 2M so that the selector control circuits and the arm motors 85 and 86 are inoperative during this time. When the head is down, the limit switch LS–1 is closed energizing the relay 3RR and this, by closing the contacts 3RR–1, energizes the relay 2CR which, like the relay 1CR, completes the circuits of the relays 6CR, 1M and 2M to close the arm motor and selector control circuits.

With the head 28 and the tool 31 down, the router is ready to begin cutting the workpiece 33. Assume, for example, that the arms 25 and 27 are generally in the positions shown in Fig. 3 and that it is desired to cut around the outside of the template 35 beginning at the point 213, the tool 31 being at this point. In cutting around the outside of a template with the arms in this position, the tool is fed counterclockwise around the template. Therefore, the selector 87 is tilted to the right as shown. Such tilting causes the Microswitch 149 to open and deenergize the relay BCR so that the contacts BCR–1 and BCR–2 are opened and the brakes 132 and 133 are only partially energized to permit swinging of the router arms.

Tilting of the selector 87 also causes the selector plate 165 to be shifted to the left as viewed in Fig. 21 and this moves the core 181 of the reactor 179 to the left. Also, due to the inclination of the edge 176 of the plate, the core 183 of the reactor 180 is moved toward the operator (down in Fig. 21) but the distance this core moves is only a small proportion of the distance the core 181 is moved. Shifting of the core 181 causes the phase shifting and discriminating network 185 to apply to the voltage regulator 193 a signal which reduces the voltage across the control field winding 192 of the generator 189. As a result, the two field windings 191 and 192 no longer balance each other and the generator develops a voltage in a negative direction and of a magnitude depending upon the distance the core 181 has been moved. This voltage is applied to the armature winding of the motor 85 which is turned in a direction to swing the inner arm 25 counterclockwise about the axis a. This advances the tool 31 to the right.

In a similar manner, movement of the reactor core 183 causes a reduction in the voltage applied to the control field winding 192' of the generator 189' but this reduction is substantially less than the reduction in the control field winding 192 due to the shorter movement of the core 183. As a result, the motor 86 is energized to turn the outer arm 27 counterclockwise about the axis b but at a lesser speed than that at which the inner arm 25 moves. Such turning of the outer arm holds the template follower 32 against the near edge of the template 35 (the lower edge in Fig. 3) as the tool is fed to the right.

The speed with which the tool 31 advances along the template 35 depends upon the amount the selector 87 has been tilted to the right. Thus, as the selector is tilted farther, the reactor core 181 shifts farther to the left until it is at the left end of the coil 182. During this tilting, the voltage applied to the control field winding 192 is reduced progressively to zero and this results in a corresponding increase in the speed of the motor 85. Similarly, the core 183 moves progressively toward the near end of the reactor coil 184 but is still a substantial distance from this end when the selector 87 is fully tilted. Thus, the speed of the motor 86 also is increased. Although the speeds of the motors are increased, the ratio of the speeds remains the same regardless of the amount of tilting of the selector so that only the magnitude but not the direction of the resultant force applied to the tool 31 is changed when the angle of tilting is varied.

As the tool 31 is fed along the template 35, the load on the tool may be changed as by an increase in the thickness of the workpiece 33. This added load causes a change in the voltage drop across the resistors 197 and 197' and hence a change in the input to the voltage regulators 193 and 193'. The output of the latter is varied accordingly to change the voltages across the control field windings 192 and 192'. This changes the energization of the motors 85 and 86 which thus are returned to the same speed at which they were operating before the change in load. In this way, the speed of the motors remains constant for any given angle of tilting of the selector 87 regardless of the load on the tool.

When the tool 31 reaches the near right hand corner 214 of the template 35, the operator shifts the selector 87 so that it is tilted away from him, that is, in the next direction of tool advance, as illustrated in Fig. 13. This causes the selector plate 165 to move down in Fig. 21 and, as a result, the core 183 of the reactor 180 is moved down a distance corresponding to the angle of tilting and the core 181 of the reactor 179 moves to the right of its neutral position a shorter distance. The motor 86 thus turns in the same direction as it did before but at a comparatively greater speed. The motor 85, however, is reversed since the core 181 now is on the other side of its neutral position a shorter distance. The motor 86 thus turns in the same direction as it did before but at a comparatively greater speed.

The motor 85, however, is reversed since the core 181 now is on the other side of its neutral position and this causes an increase rather than a decrease of the voltage through the control field winding 192. In this condition, the motor 85 applies clockwise torque to the inner arm 25 and the motor 86 applies to the outer arm 27 a substantially greater torque which is counterclockwise as illustrated by the arrows in Fig. 13. Thus, the tool 31 moves up as the follower 32 is held against the right edge of the template 35.

In a similar manner, the selector 87 is tilted to the left when the tool 31 reaches the far right hand corner of the template 35 and causes the motors 85 and 86 to turn both of the arms clockwise with a greater torque applied to the inner arm as shown by the arrows in Fig. 14. This feeds the tool along the far edge of the template and when the tool reaches the end of this edge, the selector is tilted toward the operator. The motor 85 then applies counterclockwise torque to the inner arm and the motor 86 applies a greater torque in the clockwise direction to the outer arm to feed the tool along the left edge of the template (see Fig. 15).

When the tool reaches the starting point 213, the selector 87 is returned to the neutral position and the operator depresses the "Head Up" push button switch 74 (Fig. 19). This closes the circuit of the relay 4CR which, by closing the contacts 4CR–r and 4CR–5, insures full energization of the brakes 132 and 133 even though the selector is not in the neutral position to close the microswitch 149. The relay also closes the contacts 4CR–1 in the circuit of the solenoid SOL–3 but this circuit is still open since the contacts 7CR–1 are not closed. By the parallel circuit 80, the "Head Up" switch 74 energizes the solenoid SOL–4 and this raises the tool 31 and spindle 29 up into the head 28. When the tool is up, the limit switch LS–2 is closed energizing the relay 7CR. The latter closes the contacts 7CR–1 completing the circuit of the solenoid SOL–3 which shifts the spool 60 of the valve 58 to raise the head. With the head in the upper position, the limit switch LS–3 is opened deenergizing the relay 4CR. At this time, the control and energizing circuits again are conditioned for operation by the relay 1CR, as described previously, and the selector 87 may be shifted to traverse the tool above the work. If it is desired to shut down the machine, "Stop" push button switches 215, 216 and 217 are depressed.

In making a cut around the inside of a template 35', the router is operated by the same manipulations of the selector 87 set forth above but, as illustrated in Figs. 4, 16, 17 and 18, the tool travels in a clockwise direction. The foregoing examples of selector movement illustrate four directions in which the tool may be moved. Of course, the tool may be advanced in any desired direction simply by tilting the selector in that direction. When the selector is tilted in any one of the infinite number of directions available, it energizes the motors 85 and 86 differentially but the ratio of energization is different for each direction of selector movement to apply the proper resultant to the tool and follower for advancing the latter in the desired direction. For example, if the tool is to be moved away from and to the right of the operator, the selector is tilted in that direction. This causes the core 183 of the reactor 180 to move down as viewed in Fig. 21 and the core 181 to shift to the left a substantially equal, although slightly lesser, distance. As a result, the motors apply almost equal counterclockwise torques to the arms and the combined movement of the arms advances the tool in the desired direction.

It will be observed that a machine equipped with the control system of the present invention is extremely sensitive to movement of the selector 87 which thus is capable of causing the tool to advance in any one of an infinite number of directions. This is achieved through the use of the control members 156 and 157 which permit not only a wide selection of the direction of tool advance but also permit control of the speed with which the tool moves in each direction. With this arrangement, therefore, the tool may be traversed in the proper direction and at the optimum speed for each individual workpiece.

This application is a continuation of my copending application Serial No. 402,982, filed January 8, 1954, now abandoned.

I claim as my invention:

1. A router comprising a base including a stationary hollow post, an inner arm journaled on said post to swing about the axis of the post, a power actuator mounted on said base and having a rotatable driven part, a clutch including two frictionally engageable elements connected to said part and said inner arm respectively and normally engaged to turn the arm when said actuator is energized but to slip when loads above a predetermined value are applied to the arm, a brake comprising relatively rotatable parts mounted on said base and said arm respectively and operable during swinging of the arm to produce a force retarding such swinging, a first elongated shaft extending lengthwise of said arm and journaled on the arm, a second shaft disposed within said post and connected to said first shaft, a second power actuator for turning said second shaft and hence said first shaft, a member journaled on the outer end of said arm to turn about a second and parallel axis, a second clutch forming a similar friction coupling between said second shaft and said member, a second and similar brake having relatively rotatable and frictionally engageable parts mounted on said member and said arm respectively, and an outer arm fast on said member to turn with the member about said second axis.

2. A router comprising a base, an inner arm pivotally connected at one end to swing about a first axis, a first power actuator mounted on said base and having a driven part, a coupling including friction elements respectively connected to said part and said arm to turn the arm when said actuator is energized but to slip when loads above a predetermined value are applied to the arm, a brake comprising relatively rotatable parts respectively mounted on said base and said arm and frictionally engageable during swinging of the arm to produce a force retarding such swinging and providing an initial load, an outer arm pivotally connected at one end to the outer end of said inner arm to swing about a second axis parallel to the first, a second brake having relatively rotatable parts connected to said inner and outer arms respectively and engageable during swinging of the outer arm to produce a second and similar retarding force, a member mounted for rotation on said inner arm and extending longitudinally of the latter, a second power actuator having a driven part connected to the inner end of said member to turn the same, and a second and similar friction coupling having elements connected to the outer end of said member and said outer arm respectively to turn the outer arm when said second actuator is energized.

3. A router having, in combination, first and second arm pivotally connected together at adjacent ends to swing relative to each other about a first axis, a base pivotally supporting said first arm at the opposite end thereof for swinging about a second and parallel axis, a rotatable spindle adapted to support a cutting tool and mounted on the free end of said second arm for longitudinal movement relative to the latter and toward and away from a workpiece to be cut, two power actuators, one connected to each of said arms, operable to turn the arms about said axes, a brake including two elements rigid with said base and said first arm respectively and frictionally engageable with each other, a second brake having similar frictionally engageable elements rigid with said first and second arms respectively, a third reversible power actuator operable when energized to move said spindle back and forth on said second arm, mechanism for energizing said third actuator, and means operable automatically as an incident to energization of said third actuator to engage said brakes thereby to hold said arms against turning as said spindle is moved away from the workpiece.

4. A router comprising a base, an inner arm pivotally mounted at one end on said base to swing about a first axis, an outer arm pivotally connected at one end to the other end of said inner arm to swing about a second axis parallel to the first, two power actuators, one connected to each of said arms for swinging the arms about said axes, a first electromagnetic brake having a coil and two friction elements mounted respectively on said base and said inner arm and engageable to produce a braking force proportional to the degree of energization of said coil, a second and similar electromagnetic brake having a coil and two friction elements mounted on said inner and outer arms respectively, a first circuit for the coil of said first brake having a resistance of a value to cause the brake to be energized to a predetermined degree, a second circuit parallel to said first circuit and operable when closed to shunt out said resistance and cause full energization of said first brake, two similar circuits for said second brake, a selector having a neutral position and movable away from said position, mechanism operable in response to movement of said selector to activate said actuators thereby to swing said arms, and a control device operable when said selector is in said neutral position to close the parallel circuits of said coil and cause full engagement of the brakes and responsive to movement of the selector away from said position to open said parallel circuits and effect partial engagement of the brakes.

5. A router having, in combination, a base, an inner arm pivotally connected at one end to said base to swing about a first axis, an outer arm pivotally connected at one end to the other end of said inner arm to swing about a second and parallel axis, two power actuators, one connected to each of said arms for swinging the arms about said axes, a brake including two elements rigid with said base and said inner arm respectively and frictionally engageable with each other, a second and similar brake having frictionally engageable elements rigid with said inner and outer arms respectively, a selector having a neutral position and movable away from said position, mechanism operable in response to movement of said selector to energize said actuators thereby to swing said arms, means normally engaging said brakes to a predetermined degree to produce a force retarding swinging of the arms and providing an initial load on the arms, and a control device operable when said selector is in said neutral position to energize said brakes to a substantially greater degree and prevent said arms from swinging.

6. A router comprising first and second arms pivotally connected at adjacent ends to swing relative to each other about a first axis, a base pivotally supporting said first arm for swinging about a second and parallel axis, a brake including two elements rigid with said base and said first arm respectively and frictionally engageable with each other, a second and similar brake having two frictionally engageable elements rigid with said first and second arms respectively, two power actuators, one connected to each of said arms, for turning the arms about said axes, a selector having a neutral position and mounted for movement away from said position, means responsive to movement of said selector to energize said actuators thereby to swing said arms, and mechanism operable automatically by said selector when in said neutral position to engage said brakes and prevent said arms from turning.

7. A router comprising a base, an inner arm pivotally connected at one end to said base to swing about a first axis, an outer arm pivotally connected at one end to the other end of said inner arm to swing about a second and parallel axis, two power actuators, one connected to each of said arms for turning the arms about their respective axes, a brake including two elements rigid with said base and said inner arm respectively and frictionally engageable with each other, a second brake having similar frictionally engageable elements rigid with said inner and outer arms respectively, mechanism operable to energize said actuators to turn said arms about said axes, and means responsive to said mechanism and operable when said actuators are energized to engage said brakes thereby to produce a force retarding the turning of said arms and providing an initial load for said actuators.

8. A router comprising a base, an inner arm pivotally connected at one end to said base to turn about a first axis, an outer arm pivotally connected at one end to the other end of said inner arm to turn about a second and parallel axis, a first power actuator having a rotatable driven part, a friction clutch having a driving element connected to said part and a driven element connected to said inner arm and operable when engaged to transmit turning of said part to the outer arm but to slip when loads above a predetermined value are applied to the arm, a second power actuator having a rotatable driven part, a second and similar friction clutch coupling the driven part of said second actuator and said outer arm, means operable to condition said actuators for energization, and mechanism operable in response to said means to engage said clutches.

9. A router having, in combination, first and second arms pivotally connected together at adjacent ends to swing relative to each other about a first axis, a base pivotally supporting the other end of said first arm for swinging about a second and parallel axis, a first power actuator having a driven part, two elements connected to said first arm and said part respectively and frictionally engaging each other to couple the actuator and the arm but to slip when a load above a predetermined value is applied to the arm, a second power actuator having a driven part, a second pair of elements similarly coupling said second arm and the driven part of said second actuator to turn the arm when loads less than a predetermined value are applied to the arm, and means for energizing said actuators to swing said arms about said axes.

10. A router comprising first and second arms pivotally connected together at adjacent ends to swing relative to each other about a predetermined axis, a base pivotally supporting the other end of said first arm to swing about a second and parallel axis, said second arm adapted to carry a tool and a template follower at the free end thereof, a first power actuator having a driven part connected to said first arm to turn the arm about said first axis, a control device including a member having a normal position and movable back and forth through a predetermined range, said member being operable during such movement to vary progressively the energization of said actuator in proportion to the distance the member moves from said position and thereby vary the torque applied to said first arm, a second power actuator having a driven part connected to said second arm, a second and similar control device including a second member movable toward and away from a second normal position and progressively varying the energization of said second actuator in proportion to the distance the member moves from said second position and means for moving said members differentially to selected positions and for holding the members in said positions to obtain different resultant forces applied to the free end of said second arm.

11. A router comprising a base, an inner arm pivotally connected at one end to said base to swing about a first axis, an outer arm pivotally connected at one end to the other end of said inner arm to swing about a second and parallel axis and adapted to carry a cutting tool and a template follower at its free end, a first power actuator coupled to said inner arm to swing the arm about said first axis and energizable progressively to apply different torques to the arm for turning the arm at different speeds, a second and similar power actuator for applying varying torques to said outer arm to swing the latter about said second axis, an element movable to a plurality of positions and selectively operable to determine the speed at which said arms are turned by the corresponding actuators, control mechanism conditioned in response to movement of said element and operable to energize said actuators and apply torques to said arms for obtaining the selected speed, and means responsive to the load on said cutter and operable to modify the condition of said control mechanism thereby to vary the energization of said actuators and maintain the selected speed.

12. A router having, in combination, a base, an inner arm one end journaled on said base to swing about a first predetermiend axis, an outer arm having one end pivotally connected to the outer end of said inner arm to swing about a second and parallel axis and adapted to carry a cutting tool and a template follower at its free end, a first power actuator having a driven element connected to said inner arm and operable to turn the latter about said first axis at a speed proportional to the degree of energization of the actuator, a second and similar power actuator connected to said outer arm, control means operable to energize said actuators progressively through a predetermined range, and a selector element movable in a plurality of directions from a neutral position and operable when moved in the different directions to activate said control means and energize said actuators in different proportions thereby to control the ratios of the speed of turning of said arms about their respective axes, said control means increasing the energization of said actuators but in the proportion according to the direction of selector movement as the selector is moved further from said neutral position.

13. A router having, in combination, a base, an inner arm pivotally connected at one end to said base to turn about a first axis, an outer arm pivotally connected at one end to the outer end of said inner arm and adapted to carry a tool and a template follower at the free end thereof, power actuated mechanism operatively connected to said arms and operable differentially to apply different torques to the arms and produce a resultant force acting on said outer arm and in a selected direction, a selector member having a normal position located at a predetermined point, means supporting said member for movement away from said point and also for movement about said point through a predetermined angle whereby the member is capable of moving radially away from said point in all directions within said angle, and control means responsive to movement of said selector member and operable to vary progressively the energization of said power actuated mechanism as said member moves about said point through said angle, said control mechanism thereby producing a resultant force acting in a different direction for each direction of movement of said member and causing the force to act in a direction correlated with the direction of movement of said selector.

14. In a machine tool having a base and first and second members mounted on the base for movement relative to each other and to the base, the combination of, first and second reversible power actuators coupled respectively to said first and second members and operable when energized to move the same along separate paths, a first variable reactance device having a coil and a core movable in opposite directions from a neutral position intermediate the ends of the coil, a second and similar variable reactance device having a core movable in a direction perpendicular to the movement of said first core, means for energizing said first and second actuators in a direction and magnitude according to the direction and amount of movement of said first and second cores respectively, a selector having a normal position and movable radially in a plurality of directions away from the normal position, and a connection between said selector and each of said cores holding the cores in their neutral positions when the selector is in said normal position and operable to move the cores differentially according to the direction of movement of the selector thereby to energize said actuators in different ratios.

15. In a machine tool having a base and first and second members mounted on the base for movement relative to the base and to each other, the combination of, a first variable reactance device having a part movable away from a neutral position, a power actuator connected to said first member to move the same along a predetermined path and energized in magnitude and direction in accordance with the amount of movement of said part, a second power actuator connected to said second part to move the latter along a second path, a second variable reactance device having a member movable in a direction perpendicular to the movement of said first part and similarly controlling the energization of said second actuator, a selector having a normal position and movable in a plurality of directions radially away from the normal position, and a connection between said selector and each of said parts operable to move the parts differentially according to the direction of movement of said selector thereby to energize said actuators in different ratios.

16. A machine tool comprising a base, a first member mounted on said base for movement along a first predetermined path, a second member mounted on said first member for movement relative thereto along a second path and adapted to carry a cutting tool and a template follower movable in accordance with the compound movement of said members, first and second reversible power actuators connected respectively to said first and second members and operable when energized to move said members along said paths and produce a resultant force acting on said tool and follower of a magnitude and direction according to the degrees of energization of the actuators, said actuators being effective respectively to move said tool in generally perpendicular directions, two control elements each movable along a path paralleling one of said perpendicular directions and controlling the degree of energization of the corresponding actuator, a cam having a normal position and mounted for movement radially from said position, a first surface on said cam engaging one of said control elements and inclined slightly from a line perpendicular to the path of said element, and a second surface on said cam perpendicular to said first surface and engaging the other control element whereby both elements are moved when said cam is moved in either of said perpendicular directions.

17. A machine tool comprising a base, a first member mounted on said base for movement along a first predetermined path, a second member mounted on said first member for movement relative thereto along a second path and adapted to carry a cutting tool and a template follower movable in accordance with the compound movement of said members, first and second reversible power actuators connected respectively to said first and second members and operable when energized to move said members along said paths and produce a resultant force acting on said tool and follower of a magnitude and direction according to the degrees of energization of the actuators, said actuators being effective respectively to move said tool in generally perpendicular directions, two control elements movable along perpendicular paths and each controlling the degree of energization of one of said actuators, a selector having a normal position and shiftable radially away from said position, and a connection between said selector and said elements operable to move both elements when the selector is shifted in a direction corresponding to one of said perpendicular directions to energize both of said actuators and produce a resultant force at an angle to the direction of selector movement.

18. In a machine tool having first and second parts mounted for individual movement, the combination of, a first control element having a neutral position and movable longitudinally along a predetermined path in opposite directions from said position, a second and similar control element movable along a perpendicular path, a member disposed at the intersection of said elements, springs yieldably urging said elements into engagement with said surfaces, means resiliently holding said member in a normal position in which both of said elements are held in their neutral positions, a first reversible power actuator for driving said first part and energized in direction and magnitude according to the direction and amount of movement of said first element from its neutral position, a second reversible power actuator for driving said second part and similarly responsive to movement of said second element, and a selector connected to said member and manually operable to shift said member radially in different directions and distances to move said elements differentially and energize said actuators in a ratio corresponding to the direction of selector movement and in proportion to the amount of selector movement.

19. In a machine tool having first and second parts mounted for individual movement, the combination of, a control member having a normal position and mounted for movement radially away from said position in different directions, a first element yieldably urged into abutting engagement with said member and held in a neutral position by the member when the latter is in said normal position, said element being shiftable longitudinally in opposite directions from said neutral position when said member is moved from said normal position, a second and similar element angularly spaced from said first element and yieldably urged against said member to move in opposite directions from its neutral position in response to movement of the member, a first reversible power actuator for driving said first part and energized in direction and magnitude in accordance with the direction and amount of shifting of said first element from its neutral position, and a second reversible power actuator for driving said second part and similarly responsive to movement of said second element.

20. In a machine tool having a base and two members mounted on said base for movement relative to the base and each other, the combination of, a first control device having an element movable along a first predetermined path, a second control device having an element similarly movable along a path angularly spaced from said first path, a cam having a normal position and shiftable radially from said position in all directions within a predetermined angle, surfaces on said cam engaging said elements and operable to move said elements along said paths in different proportions according to the direction of movement of said cam, a first power actuator driving said first member and energized in accordance with movement of the element of said first control device, and a second power actuator driving said second member and similarly responsive to said second control device whereby said two actuators are energized proportionately according to the direction of cam movement and to a degree depending upon the amount of cam movement.

21. In a machine tool having a base and two members mounted on the base for movement relative to each other and to the base, the combination of, a first variable speed reversible electric motor having a driven part connected to one of said members to move the latter along a predetermined path, a second and similar motor having a driven part connected to the other member to move the member along a second path, two generators, each producing a unidirectional voltage variable in direction and magnitude and each applying its voltage to one of said motors, a selector having a normal position and mounted for movement radially away from said position in a plurality of directions, and means responsive to movement of said selector and operable to control the direction and magnitude of the output voltages of said generators, the direction of each voltage being responsive to the direction of selector movement and the magnitude of each voltage being responsive both to the direction of selector movement and the amount the selector is moved from said normal position.

22. In a machine tool having a base and two members mounted for movement relative to each other and to the base, the combination of, a first variable speed reversible electric motor having a driven part connected to one of said members and operable when energized to move the member along a first path, a second and similar motor connected to the other member to move the latter along a second path, first and second control elements angularly disposed relative to each other and each movable through a predetermined range, a selector having a normal position and shiftable radially selected distances from said position and in a plurality of directions, a connection between said selector and both of said elements operable to move said elements in a predetermined ratio for each direction of shifting of the selector, a first generator producing a unidirectional output voltage which is applied to said first motor and which varies in direction and magnitude in response to shifting of said first element, and a second generator producing a unidirectional output voltage which is applied to said second motor, and which is responsive in direction and magnitude to the shifting of said second element whereby the combined shifting of said elements proportions the energization of said motors.

References Cited in the file of this patent

UNITED STATES PATENTS

| | | |
|---|---|---|
| 2,410,295 | Kuehni et al. | Oct. 29, 1946 |
| 2,629,844 | Eserkaln | Feb. 24, 1953 |
| 2,693,737 | Smith | Nov. 9, 1954 |
| 2,723,598 | Mann | Nov. 15, 1955 |